(12) United States Patent
Fukumasu

(10) Patent No.: US 11,895,278 B2
(45) Date of Patent: Feb. 6, 2024

(54) IMAGE READING APPARATUS

(71) Applicant: SEIKO EPSON CORPORATION, Tokyo (JP)

(72) Inventor: Keiichiro Fukumasu, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/175,714

(22) Filed: Feb. 28, 2023

(65) Prior Publication Data

US 2023/0283725 A1 Sep. 7, 2023

(30) Foreign Application Priority Data

Mar. 2, 2022 (JP) ................................. 2022-031946

(51) Int. Cl.
*H04N 1/00* (2006.01)
(52) U.S. Cl.
CPC ..... *H04N 1/00549* (2013.01); *H04N 1/00559* (2013.01); *H04N 1/00806* (2013.01)
(58) Field of Classification Search
USPC ........................................................ 358/498
See application file for complete search history.

(56) References Cited

U.S. PATENT DOCUMENTS

| | | | | |
|---|---|---|---|---|
| 11,716,431 B2* | 8/2023 | Matsuyama | ....... | H04N 1/00774 |
| | | | | 358/1.12 |
| 2007/0188818 A1* | 8/2007 | Westcott | ............ | H04N 1/00583 |
| | | | | 358/296 |
| 2020/0076974 A1* | 3/2020 | Koyanagi | .......... | H04N 1/00557 |
| 2021/0243316 A1* | 8/2021 | Tezuka | ............... | H04N 1/00551 |

FOREIGN PATENT DOCUMENTS

| | | |
|---|---|---|
| JP | 2009-527143 A | 7/2009 |
| JP | 2021-125740 A | 8/2021 |

* cited by examiner

*Primary Examiner* — Jacky X Zheng
(74) *Attorney, Agent, or Firm* — WORKMAN NYDEGGER

(57) ABSTRACT

An image reading apparatus includes a body support section, an apparatus body supported by the body support section, and a reading section configured to read a document. The apparatus body is configured to rotate about a rotation shaft with respect to the body support section and the apparatus body is rotated to be switched to a first position or a second position, a position of the center of gravity of the apparatus body is located at a position vertically above a shaft axis of the rotation shaft and closer than the shaft axis to an apparatus front in an apparatus depth direction when the apparatus body is in the first position, and is located at a position vertically above the shaft axis of the rotation shaft and closer than the shaft axis to an apparatus rear in the depth direction when the apparatus body is in the second position.

11 Claims, 15 Drawing Sheets

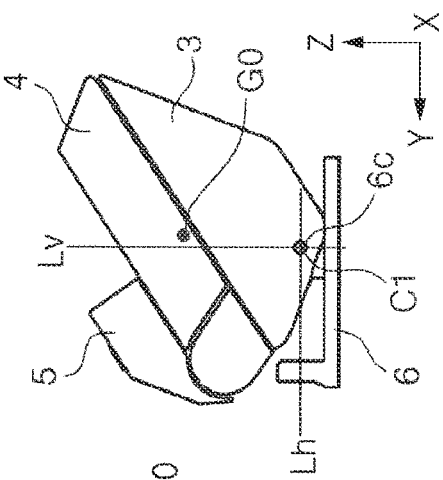
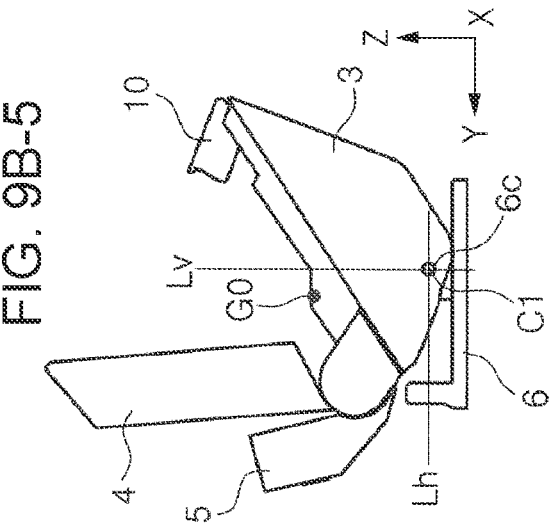
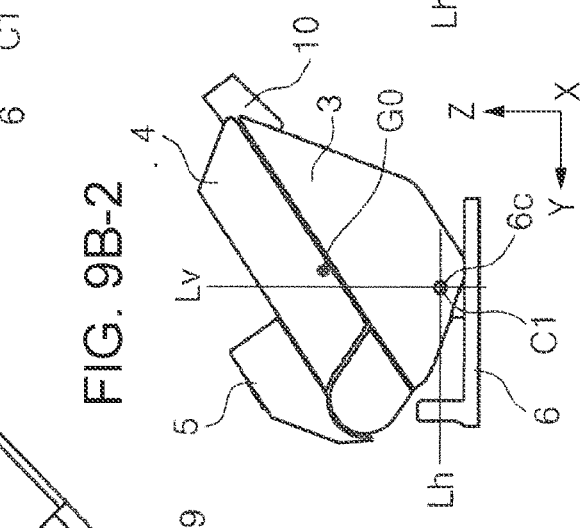
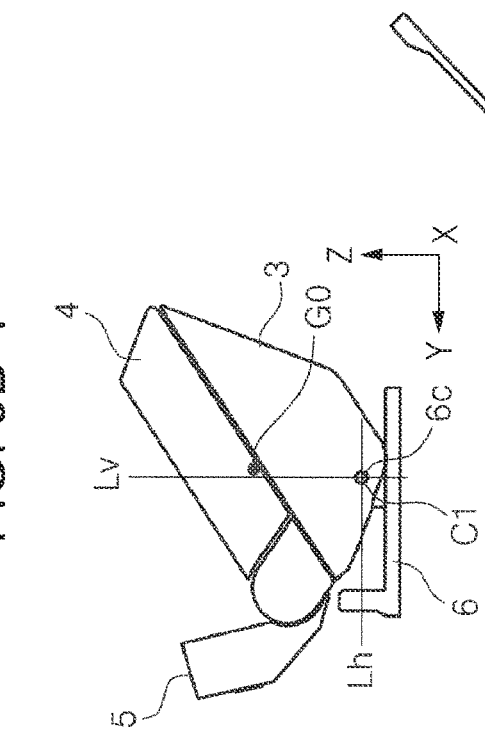
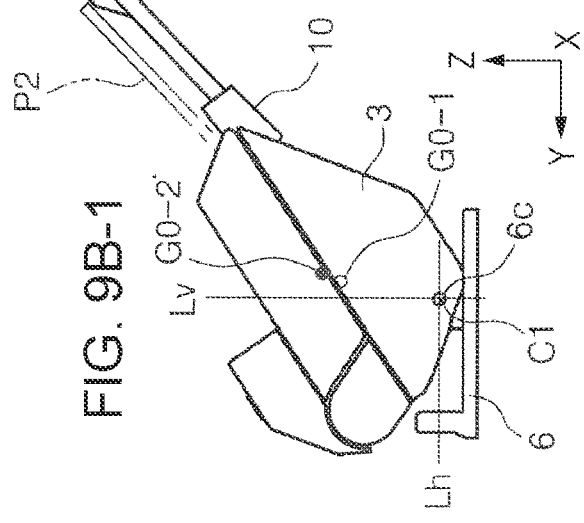

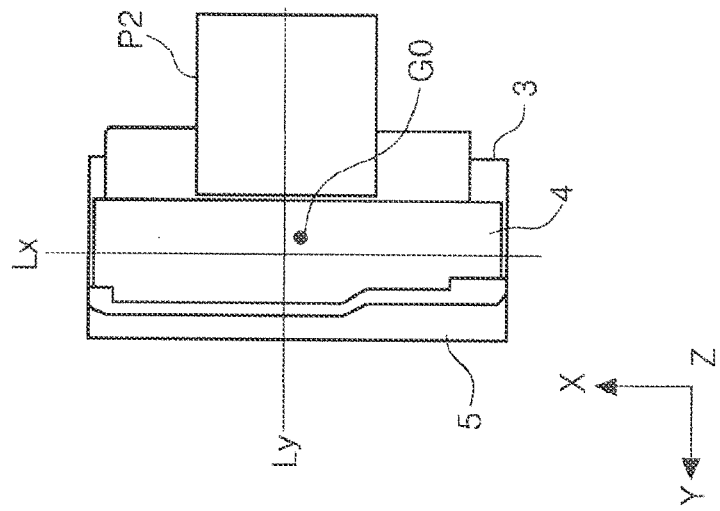
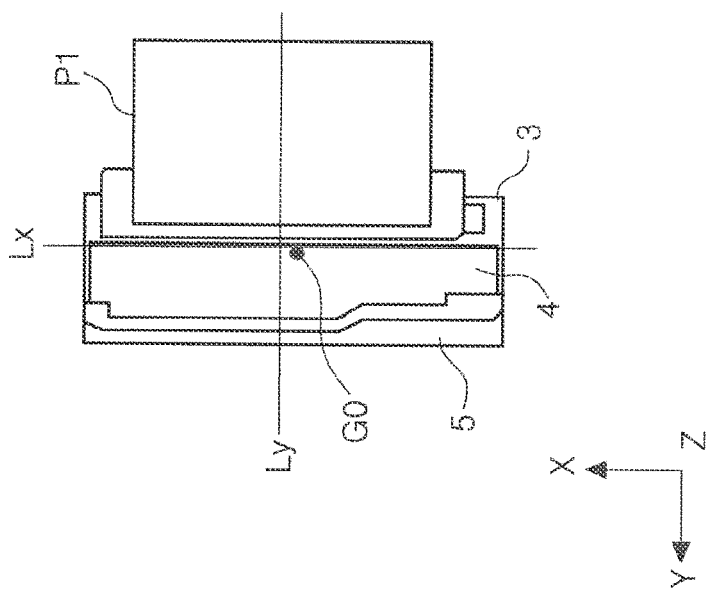

IMAGE READING APPARATUS

The present application is based on, and claims priority from JP Application Serial Number 2022-031946, filed Mar. 2, 2022, the disclosure of which is hereby incorporated by reference herein in its entirety.

BACKGROUND

1. Technical Field

The present disclosure relates to an image reading apparatus that reads an image of a medium.

2. Related Art

A sheet-fed scanner is an example of image reading apparatuses. A scanner described in JP-T-2009-527143 includes an apparatus body that can be rotated with respect to a support base, and by rotating the apparatus body, the inclination of a sheet path with respect to an installation surface can be switched. The position of the apparatus body in the scanner according to JP-T-2009-527143 is held by a latch mechanism.

When the position of the center of gravity of the apparatus body is away from the center of rotation, however, the apparatus body may readily rotate in a direction in which the apparatus body is switched to another position, applying a large force to the mechanism for holding the apparatus body in the position. In such a case, the apparatus may become unstable, and a larger mechanism for holding the apparatus body in the position may be required and it may be costly.

SUMMARY

According to an aspect of the present disclosure, an image reading apparatus includes a body support section mounted on an apparatus mounting surface, an apparatus body supported by the body support section, a reading section configured to read a document, and a reading transport path on which the document is transported and that faces the reading section. The apparatus body is configured to rotate about a rotation shaft with respect to the body support section and the apparatus body is rotated to be switched to a first position or a second position at which an angle formed by the reading transport path and the mounting surface is smaller than an angle formed by the reading transport path and the mounting surface at the first position, a position of the center of gravity of the apparatus body is located at a position vertically above a shaft axis of the rotation shaft and closer than the shaft axis to an apparatus front in an apparatus depth direction that is a direction intersecting the axis direction of the rotation shaft and the vertical direction when the apparatus body is in the first position, and is located at a position vertically above the shaft axis of the rotation shaft and closer than the shaft axis to an apparatus rear in the depth direction when the apparatus body is in the second position.

BRIEF DESCRIPTION OF THE DRAWINGS

FIGS. 8A-1 to 8A-5 illustrate changes in position of the center of gravity of an apparatus body when the apparatus body is in a normal reading position.

FIGS. 9B-1 to 9B-5 illustrate changes in position of the center of gravity of an apparatus body when the apparatus body is in a book reading position.

FIG. 11A-1 is a plan view illustrating a position of the center of gravity of an apparatus body when the apparatus body is in a normal reading position. FIG. 11B-1 is a plan view illustrating a position of the center of gravity of an apparatus body when the apparatus body is in a book reading position.

DESCRIPTION OF EXEMPLARY EMBODIMENTS

Figure 1:
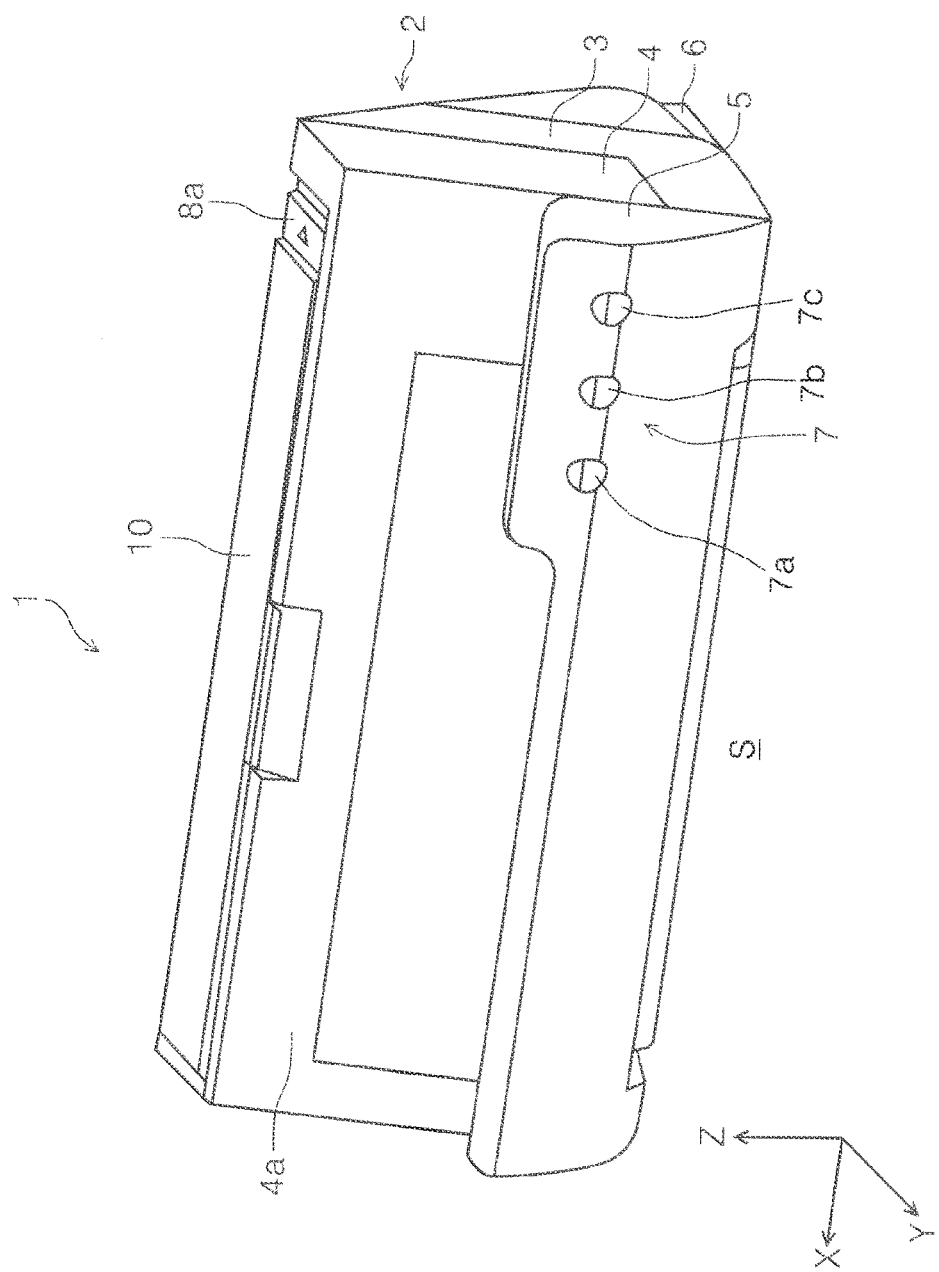
FIG. 1 is a perspective view illustrating a scanner viewed from the front when an apparatus body is in a normal reading position.

Hereinafter, an overview of the present disclosure will be described. An image reading apparatus according to a first aspect includes a body support section mounted on an apparatus mounting surface, an apparatus body supported by the body support section, a reading section configured to read a document, and a reading transport path on which the document is transported, the reading transport path facing the reading section. The apparatus body is configured to rotate about a rotation shaft with respect to the body support section and the apparatus body is rotated to be switched to a first position or a second position at which an angle formed by the reading transport path and the mounting surface is smaller than an angle formed by the reading transport path and the mounting surface at the first position, a position of the center of gravity of the apparatus body is located at a position vertically above a shaft axis of the rotation shaft and closer than the shaft axis to an apparatus front in an apparatus depth direction that is a direction intersecting the axis direction of the rotation shaft and the vertical direction when the apparatus body is in the first position, and is located at a position vertically above the shaft axis of the rotation shaft and closer than the shaft axis to an apparatus rear in the depth direction when the apparatus body is in the second position.

According to the first aspect, in a configuration in which a position of the center of gravity of the apparatus body is located at a position vertically above a shaft axis of the rotation shaft, when the apparatus body is in the first position, the position of the center of gravity of the apparatus body in an apparatus depth direction is closer than the shaft axis to an apparatus front. Accordingly, the weight of the apparatus body acts by gravity in the direction in which the apparatus body stays in the first position. More specifically, when the apparatus body is in the first position, the weight of the apparatus body does not act in the direction in which the apparatus body moves to the second position. Similarly, when the apparatus body is in the second position, the weight of the apparatus body does not act in the direction in which the apparatus body moves to the first position. This configuration enables the apparatus body to stay in a position stably, and thus a larger section for holding the apparatus body in a position can be eliminated and its cost can be eliminated.

According to a second aspect, in the image reading apparatus according the first aspect, the apparatus body may include a feed tray configured to be switched between a state in which the feed tray is accommodated in the apparatus body and a state in which the feed tray is extended from the apparatus body, the feed tray disposed closer than the shaft axis to the apparatus rear in the apparatus depth direction in the state in which the feed tray is extended from the apparatus body, and the position of the center of gravity of the apparatus body in the apparatus depth direction is, regardless of the state of the feed tray, located at a position closer than the shaft axis to the apparatus front when the apparatus body is in the first position, and located at a position closer than the shaft axis to the apparatus rear when the apparatus body is in the second position.

In this configuration in which a feed tray configured to be switched between a state in which the feed tray is accommodated in the apparatus body and a state in which the feed tray is extended from the apparatus body, the position of the center of gravity of the apparatus body may change depending on the state of the feed tray. However, according to the second aspect, the position of the center of gravity of the apparatus body in the apparatus depth direction is closer than the shaft axis to the apparatus front when the apparatus body is in the first position, and is closer than the shaft axis to the apparatus rear when the apparatus body is in the second position, regardless of the state of the feed tray. Accordingly, the effects and advantages according to the first aspect can be achieved regardless of the state of the feed tray.

According to a third aspect, in the first or second aspect, the apparatus body may include a first unit that serves as a lower side of the reading transport path, and a second unit openable and closable with respect to the first unit, the second unit serving as an upper side of the reading transport path. The position of the center of gravity of the apparatus body in the apparatus depth direction is, regardless of the state of the second unit, located at a position closer than the shaft axis to the apparatus front when the apparatus body is in the first position, and located at a position closer than the shaft axis to the apparatus rear when the apparatus body is in the second position.

In this apparatus body including a first unit that serves as a lower side of the reading transport path and a second unit openable and closable with respect to the first unit and serves as an upper side of the reading transport path, the position of the center of gravity of the apparatus body may change depending on the state of the second unit. However, according to the third aspect, the position of the center of gravity of the apparatus body in the apparatus depth direction is closer than the shaft axis to the apparatus front when the apparatus body is in the first position and is closer than the shaft axis to the apparatus rear when the apparatus body is in the second position regardless of the opening/closing state of the second unit. Accordingly, the effects and advantages according to the first aspect can be achieved regardless of the opening/closing state of the second unit.

According to a fourth aspect, in the first or second aspect, the apparatus body may include a first unit that serves as a lower side of the reading transport path, a second unit openable and closable with respect to the first unit, the second unit serving as an upper side of the reading transport path, and a third unit rotatable with respect to both the first unit and the second unit, the third unit serving as a document transport path downstream of the reading transport path. The position of the center of gravity of the apparatus body in the apparatus depth direction is, regardless of the opening/closing state of the third unit, located at a position closer than the shaft axis to the apparatus front when the apparatus body is in the first position, and located at a position closer than the shaft axis to the apparatus rear when the apparatus body is in the second position.

In this apparatus body including a third unit rotatable with respect to both the first unit and the second unit, the third unit serving as a document transport path downstream of the reading transport path, the position of the center of gravity of the apparatus body may change depending on the opening/closing state of the third unit. However, according to the fourth aspect, the position of the center of gravity of the apparatus body in the apparatus depth direction is closer than the shaft axis to the apparatus front when the apparatus body is in the first position and is closer than the shaft axis to the apparatus rear when the apparatus body is in the second position regardless of the opening/closing state of the third unit. Accordingly, the effects and advantages according to the first aspect can be achieved regardless of the opening/closing state of the third unit.

According to a fifth aspect, in the third or fourth aspect, the position of the center of gravity of the first unit may be located at a position closer than the shaft axis to the apparatus rear in the apparatus depth direction when the apparatus body is in the second position.

According to the fifth aspect, the position of the center of gravity of the first unit may be located at a position closer than the shaft axis to the apparatus rear in the apparatus depth direction when the apparatus body is in the second position. Accordingly, this configuration enables the apparatus body to readily bring the position of the center of gravity of the apparatus body to a position closer than the shaft axis to the apparatus rear when the apparatus body is in the second position.

According to a sixth aspect, in any one of the third to fifth aspects, the position of the center of gravity of the second unit may be located at a position closer than the shaft axis to the apparatus front in the apparatus depth direction when the apparatus body is in the first position. According to the sixth aspect, the position of the center of gravity of the second unit may be located at a position closer than the shaft axis to the apparatus front in the apparatus depth direction when the apparatus body is in the first position. Accordingly, this configuration enables the apparatus body to readily bring the position of the center of gravity of the apparatus body to a position closer than the shaft axis to the apparatus front when the apparatus body is in the first position.

According to a seventh aspect, in any one of the first to sixth aspect, the apparatus body may include a weight that is located at a position closer than the shaft axis to the apparatus front in the apparatus depth direction when the apparatus body is in the first position and is located at a position closer than the shaft axis to the apparatus rear in the apparatus depth direction when the apparatus body is in the second position.

According to the seventh aspect, the apparatus body may include a weight that is located at a position closer than the shaft axis to the apparatus front in the apparatus depth direction when the apparatus body is in the first position and is located at a position closer than the shaft axis to the apparatus rear in the apparatus depth direction when the apparatus body is in the second position. Such a weight enables the apparatus body to readily bring the position of the center of gravity of the apparatus body to a position closer than the shaft axis to the apparatus front when the apparatus body is in the first position and to readily bring the position of the center of gravity of the apparatus body to a position closer than the shaft axis to the apparatus rear when the apparatus body is in the second position.

According to an eighth aspect, in any one of the first to seventh aspects, the image reading apparatus may include an operation section disposed on the front of the apparatus body in the apparatus depth direction, the operation section being configured to receive an operation from a user. The operation section is disposed at a position to rotate the apparatus body toward the first position when the operation section is pressed by the user, and a distance between the position of the center of gravity of the apparatus body and the shaft axis in the apparatus depth direction when the apparatus body is in the second position is longer than a distance between the position of the center of gravity of the apparatus body and the shaft axis when the apparatus body is in the first position.

In the configuration in which the operation section is disposed at a position to rotate the apparatus body toward the first position when the operation section is pressed by the user, when the user operates the operation section in a state in which the apparatus body is in the second position, the pressing force acts in the direction to change the position of the apparatus body, and it is undesirable. According to the aspect, however, a distance between the position of the center of gravity of the apparatus body and the shaft axis in the apparatus depth direction when the apparatus body is in the second position is longer than a distance between the position of the center of gravity of the apparatus body and the shaft axis when the apparatus body is in the first position. With this configuration, when the apparatus body is in the second position, the apparatus body is less likely to rotate from the second position toward the first position in response to the user operating the operation section.

According to a ninth aspect, in any one of the first to eighth aspect, the apparatus body may include a position holding section configured to hold the apparatus body in the first position when the apparatus body is in the first position and hold the apparatus body in the second position when the apparatus body is in the second position.

According to the ninth aspect, the apparatus body may include a position holding section configured to hold the apparatus body in the first position when the apparatus body is in the first position and hold the apparatus body in the second position when the apparatus body is in the second position, enabling the apparatus body to hold the apparatus body further readily in a position.

According to a tenth aspect, in any one of the first to ninth aspects, the apparatus body in the second position may protrude from the body support section rearward in the apparatus depth direction more than the apparatus body in the first position, and the body support section may include an auxiliary member configured to be switched between an accommodation state and an extended state in which the auxiliary member protrudes rearward in the apparatus depth direction more than the apparatus body and in contact with the mounting surface in the extended state.

In this configuration in which the apparatus body in the second position protrudes from the body support section rearward in the apparatus depth direction more than the apparatus body in the first position, when the apparatus body is in the second position, the apparatus body may be more likely to topple over rearward in the apparatus depth direction. According to the tenth aspect, however, the body support section includes an auxiliary member configured to be switched between an accommodation state and an extended state in which the auxiliary member protrudes rearward in the apparatus depth direction more than the apparatus body and in contact with the mounting surface in the extended state. Such an auxiliary member suppresses the apparatus body from toppling over when the apparatus body is in the second position.

According to an eleventh aspect, in the tenth aspect, the position of the center of gravity of the apparatus body may be located at a position closer than the body support section to the apparatus rear in the apparatus depth direction and vertically above the auxiliary member in the extended state, when the apparatus body is in the second position.

With this configuration in which the position of the center of gravity of the apparatus body is located at a position closer than the body support section to the apparatus rear in the apparatus depth direction when the apparatus body is in the second position, when the apparatus body is changed to the second position, the apparatus body may be more likely to topple over rearward in the apparatus depth direction. In the eleventh aspect, however, the position of the center of gravity of the apparatus body is located vertically above the auxiliary member in the extended state, and thus the apparatus body can be reliably suppressed from toppling over when the apparatus body is in the second position.

Hereinafter, an embodiment of the present disclosure will be described. In the following description, a scanner 1 that can read at least one of a first side and a second side opposite to the first side of a document will be described as an example image reading apparatus. The scanner 1 is a sheet-fed scanner that reads a document while transporting the document with respect to a reader, which will be described below. Documents in this specification include documents in sheet form and also include documents in card form and book form.

In the X-Y-Z coordinate system in the drawings, an X-axis direction denotes an apparatus width direction and also denotes a document width direction. A Y-axis direction denotes an apparatus depth direction and a Z-axis direction denotes a direction in a vertical direction. It should be noted that the Y-axis direction intersects an axis direction (X-axis direction) of a body rotation shaft 6c, which will be described below, and the vertical direction. Here, a +Y direction denotes a direction from an apparatus rear toward an apparatus front, and a −Y direction denotes a direction from the apparatus front toward the apparatus rear. A left direction viewed from the apparatus front denotes a +X direction, and a right direction denotes a −X direction. In the following description, a direction in which a document is transported may be referred to as "downstream" and the opposite direction may be referred to as "upstream".

The scanner 1 in FIG. 1 includes an apparatus body 2 and a body support section 6 that supports the apparatus body 2 such that the apparatus body 2 can be rotated. The body support section 6 is mounted on a mounting surface S for the apparatus. The mounting surface S is, for example, a surface parallel to the horizontal. The apparatus body 2 includes a first unit 3, a second unit 4, and a third unit 5.

Figure 3:
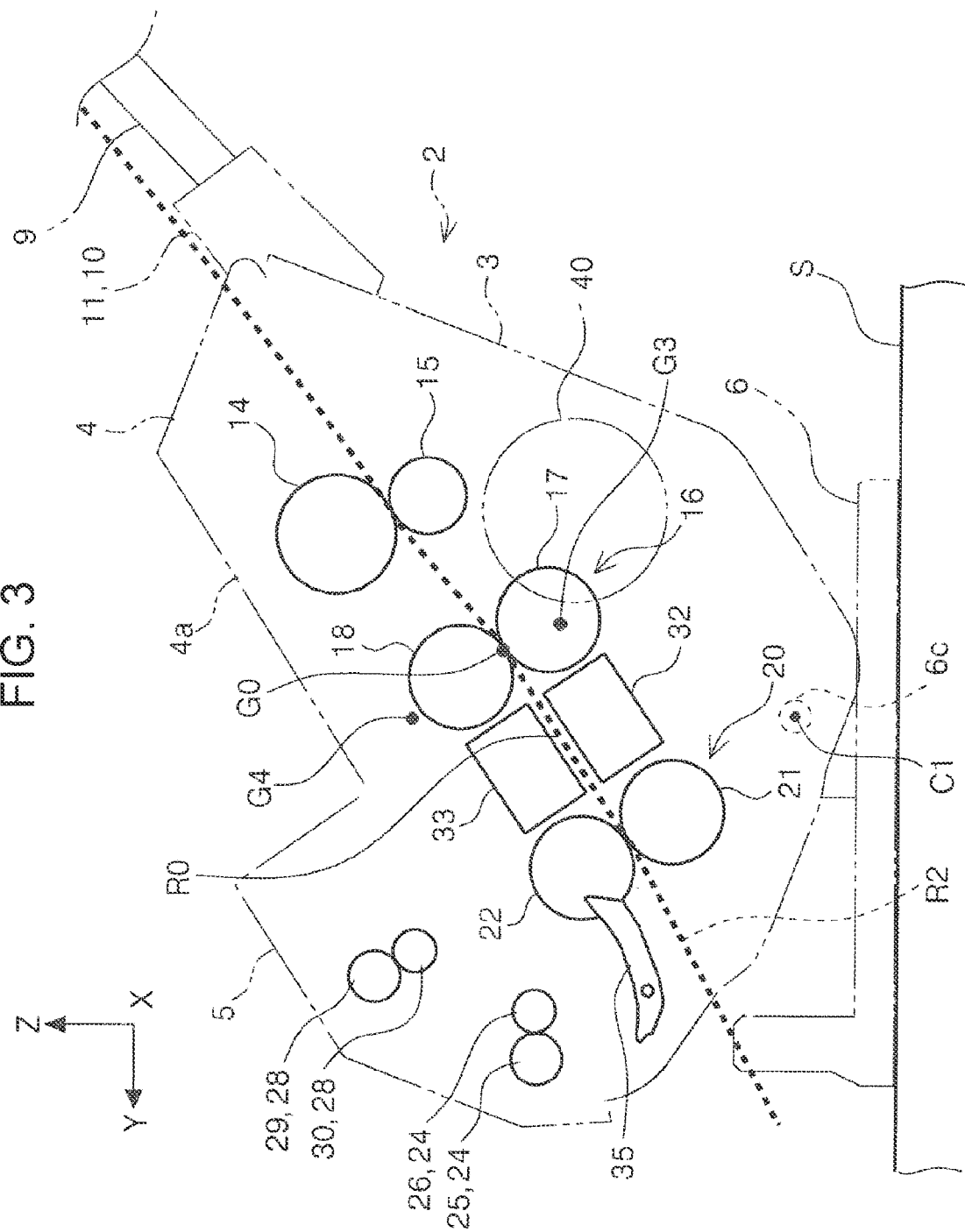
FIG. 3 is a view illustrating a document transport path in a scanner viewed in a width direction when an apparatus body is in a book reading position.
Figure 4:
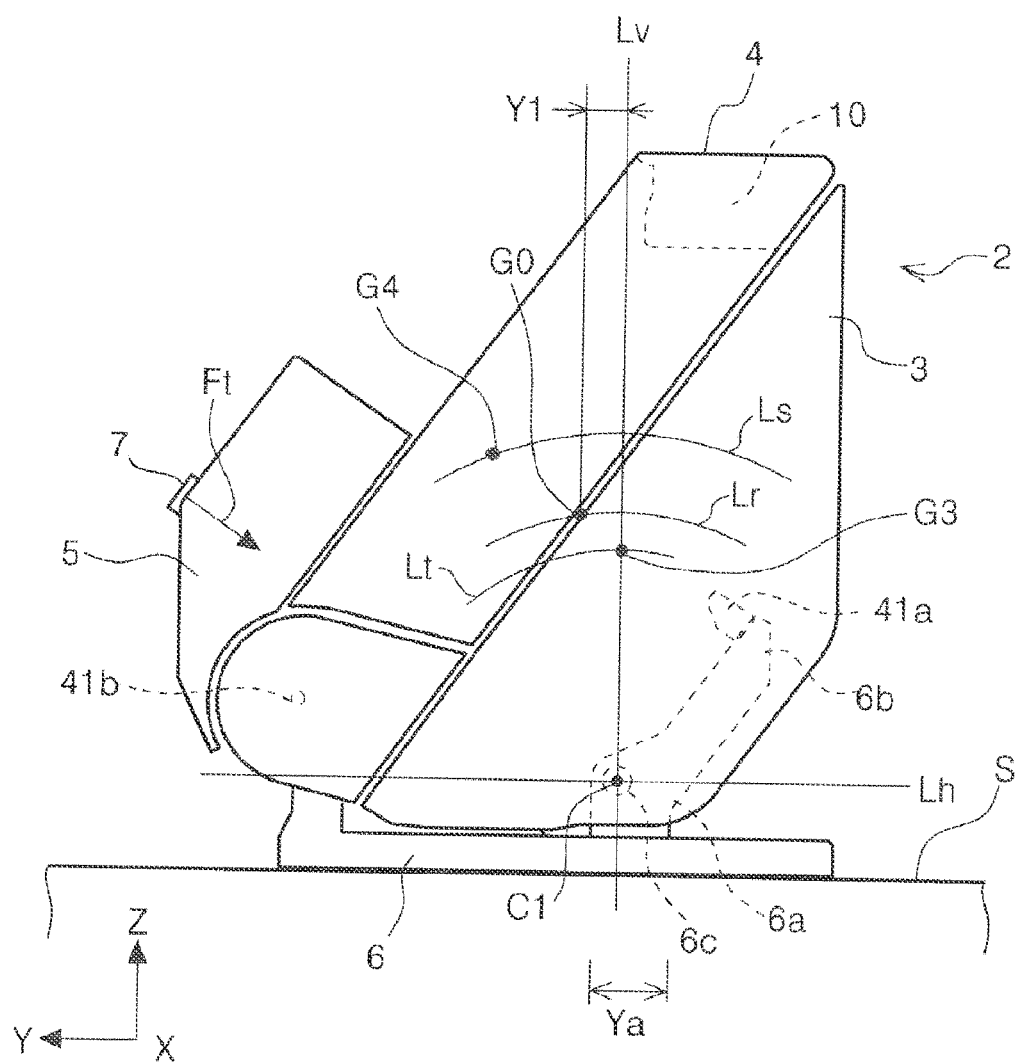
FIG. 4 is a view illustrating a scanner viewed in a width direction when an apparatus body is in a normal reading position.
Figure 5:
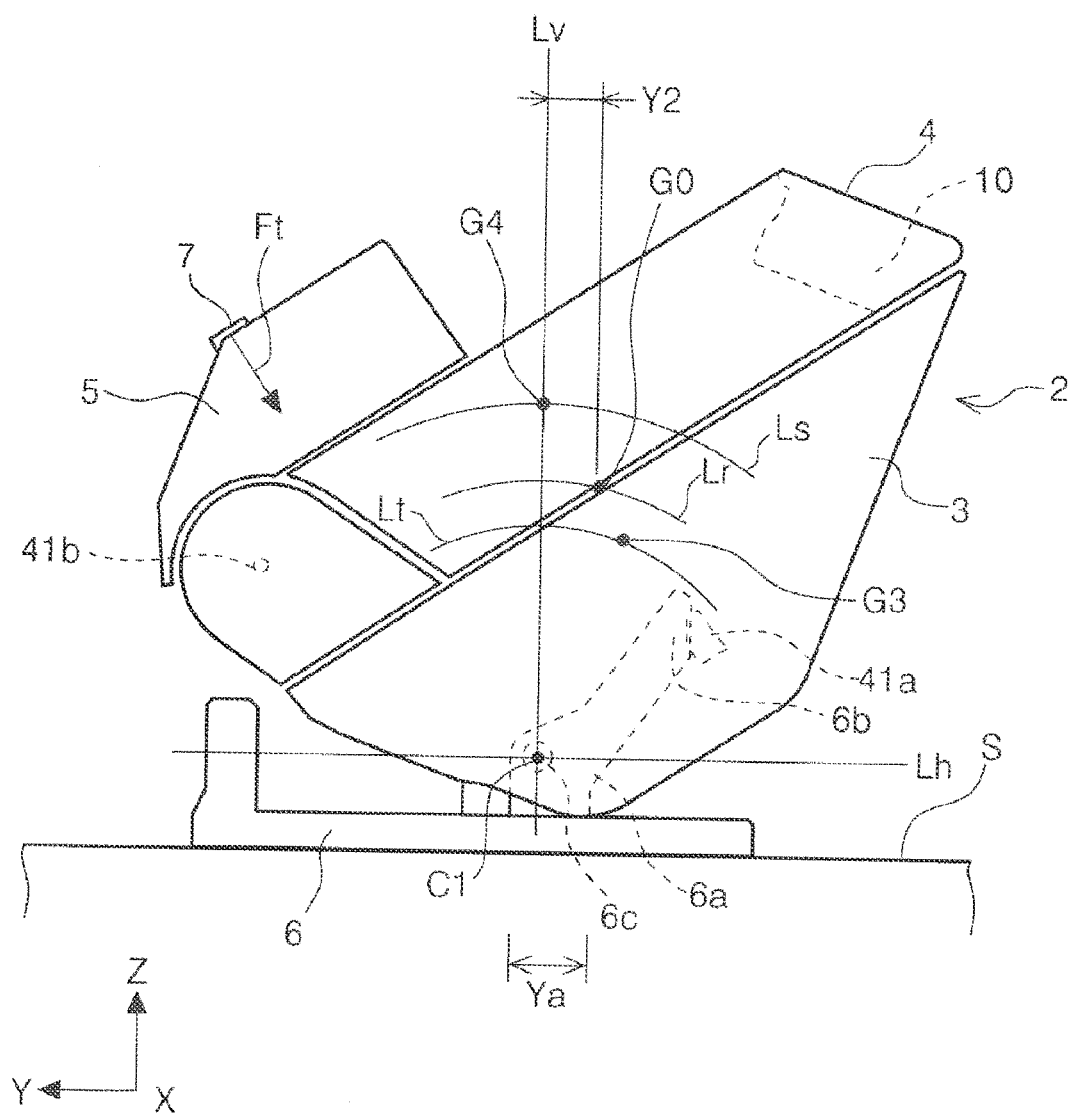
FIG. 5 is a view illustrating a scanner viewed in a width direction when an apparatus body is in a book reading position.

The second unit 4 and the third unit 5 are rotatable about a unit rotation shaft 41*b* (see FIG. 4 and FIG. 5). The unit rotation shaft 41*b* is a rotation shaft that has a rotation axis center parallel in the X-axis direction. The second unit 4 and the third unit 5 are rotatable in conjunction with each other about the unit rotation shaft 41*b* with respect to the first unit 3 (see FIG. 8A-5 and FIG. 9B-5). The user slides an unlocking section 8*a* in FIG. 1 in the −X direction to unlock the second unit 4 and the third unit 5 with respect to the first unit 3. Then, the user rotates the second unit 4 and the third unit 5 with respect to the first unit 3 to expose part of a document transport path. More specifically, the user rotates the second unit 4 with respect to the first unit 3 to expose part of a reading transport path R0 (see FIG. 2 and FIG. 3), which will be described below.

Figures 8A-1, 8A-2, 8A-3, 8A-4, 8A-5:
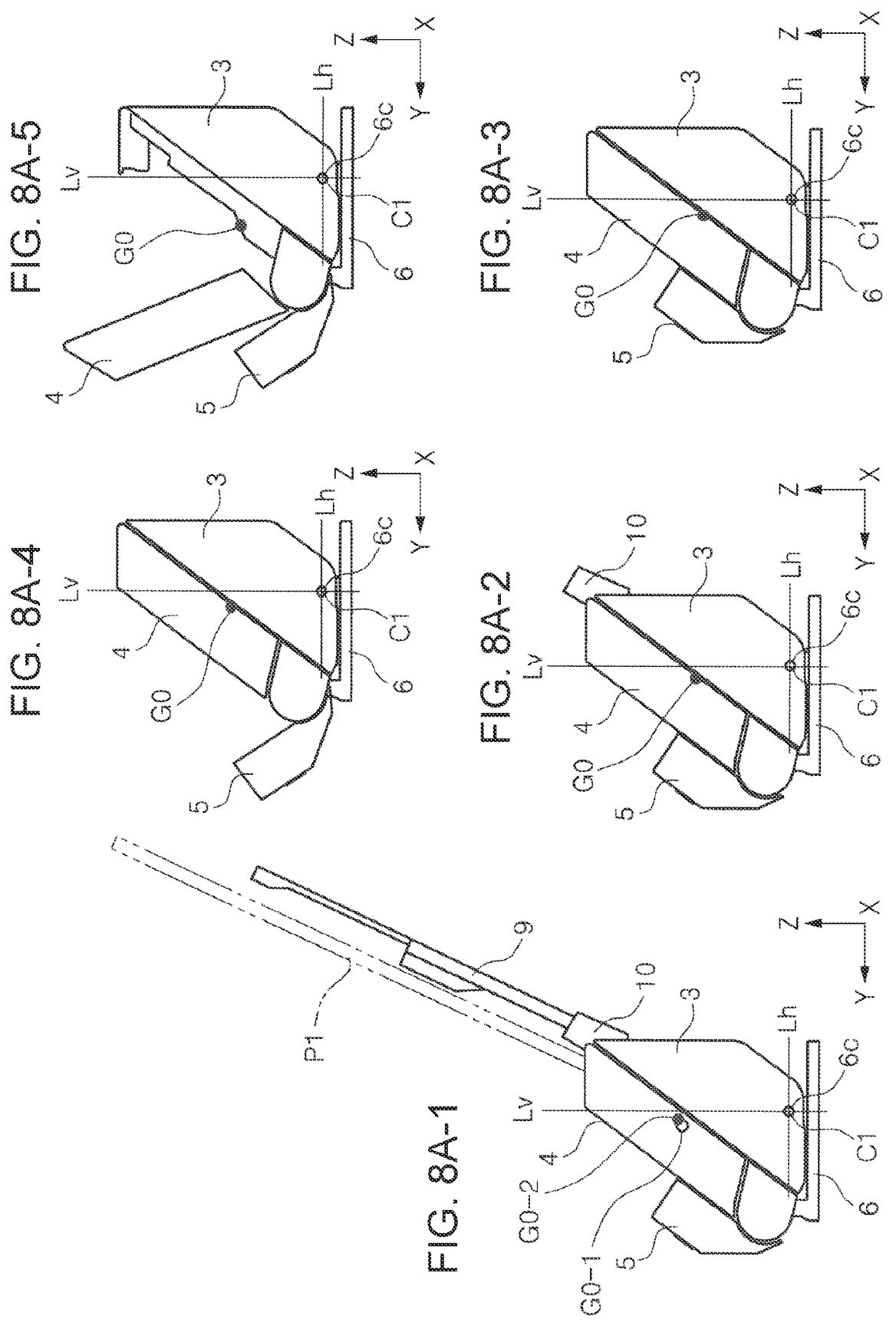

The third unit 5 is rotatable about the unit rotation shaft 41*b* with respect to the first unit 3 and the second unit 4 (see FIG. 8A-4 and FIG. 9B-4). The third unit 5 is rotated with respect to the second unit 4 to expose a U-turn discharge path R1 (see FIG. 2 and FIG. 3) located downstream of the reading transport path R0, which will be described below. The U-turn discharge path R1 is formed between the third unit 5 and the second unit 4, accordingly.

The third unit 5 is held with respect to the second unit 4 by a snap-fit mechanism (not illustrated). When the user applies an external force to the third unit 5, the fixation of the third unit 5 to the second unit 4 is released and the third unit 5 opens.

Figure 2:
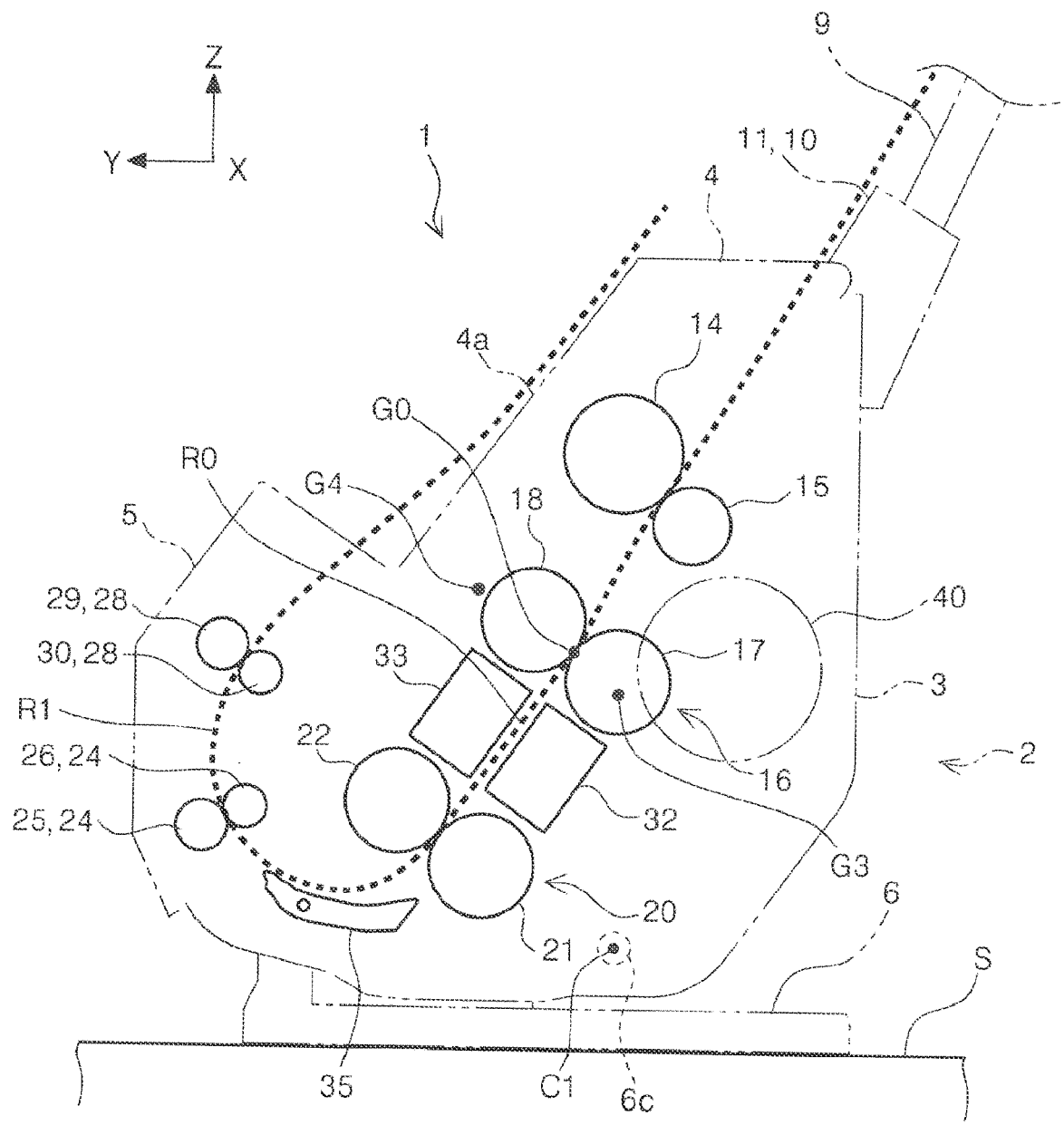
FIG. 2 is a view illustrating a document transport path in a scanner viewed in a width direction when an apparatus body is in a normal reading position.

The apparatus body 2 is rotatable about the body rotation shaft 6*c* (see FIG. 2 and FIG. 3) with respect to the body support section 6, and the apparatus body 2 according to the embodiment is rotated and held in one of two positions. The two positions of the apparatus body 2 are illustrated in FIG. 2 and FIG. 3, and hereinafter, the position in FIG. 2 is referred to as a normal reading position and the position in FIG. 3 is referred to as a book reading position. The normal reading position is an example first position of the apparatus body 2, and the book reading position is an example second position of the apparatus body 2.

An operation section 7 that includes a plurality of operation buttons is disposed on an apparatus front in FIG. 1. The operation buttons according to the embodiment include operation buttons 7*a*, 7*b*, and 7*c*, which receive user operations.

A document feeding path in the scanner 1 is described with reference to FIG. 2 and FIG. 3. In FIG. 2 and FIG. 3, the bold broken lines illustrate paths along which transported documents pass. In each path, a document transport path from a first transport roller pair 16 to a second transport roller pair 20 is the reading transport path R0. The reading transport path R0 is a document transport path that faces a first reader 32 and a second reader 33. The first unit 3 serves as a lower side of the reading transport path R0, and the second unit 4 serves as an upper side of the reading transport path R0.

The normal reading position (FIG. 2) of the apparatus body 2 is a position in which the reading transport path R0 is coupled to the U-turn discharge path R1 by a flap 35, which is an example of a transport path switching section. The book reading position (FIG. 3) of the apparatus body 2 is a position in which the reading transport path R0 is coupled to a straight discharge path R2 by the flap 35.

An angle formed by the reading transport path R0 and the mounting surface S for the apparatus when the apparatus is in the second position illustrated in FIG. 3 is smaller than that when the apparatus is in the first position illustrated in FIG. 2. A projected area of the apparatus body 2 on the mounting surface S, on which the scanner 1 is mounted, is the smallest in the normal reading position, and more specifically, a footprint of the apparatus body 2 is the smallest in the normal reading position. It should be noted that the footprint in this specification is an area occupied by the apparatus body 2 in the X-Y plane when the apparatus body 2 is viewed from above. The normal reading position is suitable in reading a document in sheet form, that is, a document that has low rigidity and readily bends. The book reading position is suitable in reading a document that has high rigidity and not readily bend, such as plastic cards and books.

Hereinafter, the document transport path is further described in detail. A document to be transported is supported in an inclined position by a document support portion 11 and a document support 9. When a plurality of document sheets is supported on the document support portion 11, the uppermost sheet is fed downstream by a feed roller 14. The document support portion 11 is a portion of an upper opening/closing section 10. The upper opening/closing section 10 is rotatable about a rotation shaft (not illustrated) and is rotated to open or close a feed slot. The document support 9 can be accommodated in the upper opening/closing section 10 and can be extended from the upper opening/closing section 10. FIG. 1 illustrates the upper opening/closing section 10 that is closed. FIG. 2 and FIG. 3 illustrate the upper opening/closing section 10 that is open and from which the document support 9 is extended. The first unit 3 includes the upper opening/closing section 10 and the document support 9.

The document support portion 11 includes a pair of edge guides (not illustrated). The pair of edge guides can be moved apart from each other across the center position in the document width direction and can be moved to come close each other in conjunction with a rack-and-pinion mechanism (not illustrated). More specifically, the scanner 1 is a center-paper-feeding scanner.

The feed roller 14 is disposed in the second unit 4. The feed roller 14 is powered by a transport motor 40 to rotate. The first unit 3 includes a separation roller 15 disposed at a position facing the feed roller 14. The separation roller 15 receives rotation torque from a torque limiter (not illustrated) to suppress the occurrence of multi-sheet feeding of document sheets. A separation pad may be provided instead of the separation roller 15. The feed roller 14 according to the embodiment is disposed on an upper side with respect to document sheets mounted on the document support portion 11 to feed from the uppermost document sheet; however, the feed roller 14 may be disposed on a lower side with respect to document sheets mounted on the document support portion 11 to feed from the lowermost document sheet.

The first transport roller pair 16 is disposed downstream of the feed roller 14 and the separation roller 15. The first transport roller pair 16 includes a first lower roller 17 that is disposed in the first unit 3 and a first upper roller 18 that is disposed in the second unit 4. The first upper roller 18 can move toward or away from the first lower roller 17 and is pressed by a pressing member (not illustrated), for example, a coil spring, against the first lower roller 17. The first lower roller 17 and the first upper roller 18 are both powered by the transport motor 40 to rotate. When the second unit 4 is closed with respect to the first unit 3, the first lower roller 17 and the first upper roller 18 come into contact with each other. When the second unit 4 is opened with respect to the first unit 3, the first upper roller 18 moves away from the first lower roller 17.

The first reader 32 and the second reader 33 are disposed downstream of the first transport roller pair 16 so as to face each other. The first reader 32 is provided in the first unit 3 and the second reader 33 is provided in the second unit 4. The first reader 32 reads a lower side (first side) of a document supported by the document support portion 11, whereas the second reader 33 reads an upper side (second side) of a document supported by the document support portion 11. The second reader 33 can move toward or away from the first reader 32 and is pressed by a pressing member (not illustrated), for example, a coil spring, against the first reader 32. In this embodiment, the first reader 32 and the second reader 33 are configured as a contact image sensor module (CISM).

The second transport roller pair 20 is disposed downstream of the first reader 32 and the second reader 33. The second transport roller pair 20 includes a second lower roller 21 that is disposed in the first unit 3 and a second upper roller 22 that is disposed in the second unit 4. The second upper roller 22 can move toward or away from the second lower roller 21 and is pressed by a pressing member (not illustrated), for example, a coil spring, against the second lower roller 21. The second lower roller 21 and the second upper roller 22 are both powered by the transport motor 40 to rotate. When the second unit 4 is closed with respect to the first unit 3, the second lower roller 21 and the second upper roller 22 come into contact with each other. When the second unit 4 is opened with respect to the first unit 3, the second upper roller 22 moves away from the second lower roller 21.

When the apparatus body 2 is in the normal reading position illustrated in FIG. 2, the U-turn discharge path R1 that reverses a read document upward and discharges the document is coupled to the reading transport path R0 at a downstream part of the reading transport path R0. When the apparatus body 2 is in the book reading position illustrated in FIG. 3, the straight discharge path R2 that discharges a read document without reversing the document is coupled to the reading transport path R0 at a downstream part of the reading transport path R0.

The U-turn discharge path R1 and the straight discharge path R2 are switched using the flap 35. The flap 35 rotates to couple the U-turn discharge path R1 to the reading transport path R0 or couple the straight discharge path R2 to the reading transport path R0. The flap 35 according to the embodiment rotates in conjunction with switching the position of the apparatus body 2. A mechanism according to the embodiment for rotating the flap 35 in conjunction with switching the position of the apparatus body 2 uses an interlock (not illustrated), for example, a cam mechanism that mechanically rotates in conjunction with the position of the apparatus body 2. It should be noted that the flap 35 may be rotated by using a solenoid (not illustrated). In such a case, a controller (not illustrated) for performing various control processes drives the solenoid to rotate the flap 35 in accordance with detection information from a position detection sensor (not illustrated).

A third transport roller pair 24 and a fourth transport roller pair 28 are disposed in the U-turn transport path R1. The third transport roller pair 24 includes a third driving roller 25 that is disposed in the third unit 5 and a third driven roller 26 that is disposed in the second unit 4. The third driven roller 26 can move toward or away from the third driving roller 25 and is pressed by a pressing member (not illustrated), for example, a coil spring, against the third driving roller 25. The third driving roller 25 is driven by the transport motor 40. The third driven roller 26 is driven and rotated.

The fourth transport roller pair 28 includes a fourth driving roller 29 that is disposed in the third unit 5 and a fourth driven roller 30 that is disposed in the second unit 4. The fourth driven roller 30 can move toward or away from the fourth driving roller 29 and is pressed by a pressing member (not illustrated), for example, a coil spring, against the fourth driving roller 29. The fourth driving roller 29 is driven by the transport motor 40. The fourth driven roller 30 is driven and rotated.

When the third unit 5 is closed with respect to the second unit 4, the third driving roller 25 and the third driven roller 26 come into contact with each other, and the fourth driving roller 29 and the fourth driven roller 30 also come into contact with each other. When the third unit 5 is opened with respect to the second unit 4, the third driving roller 25 and the third driven roller 26 move away from each other and the fourth driving roller 29 and the fourth driven roller 30 also move away from each other. A document discharged from the U-turn transport path R1 is discharged by the fourth transport roller pair 28 in an obliquely upward direction having a −Y direction component and is supported in an inclined manner by an upper surface 4a of the second unit 4.

Figure 6A:
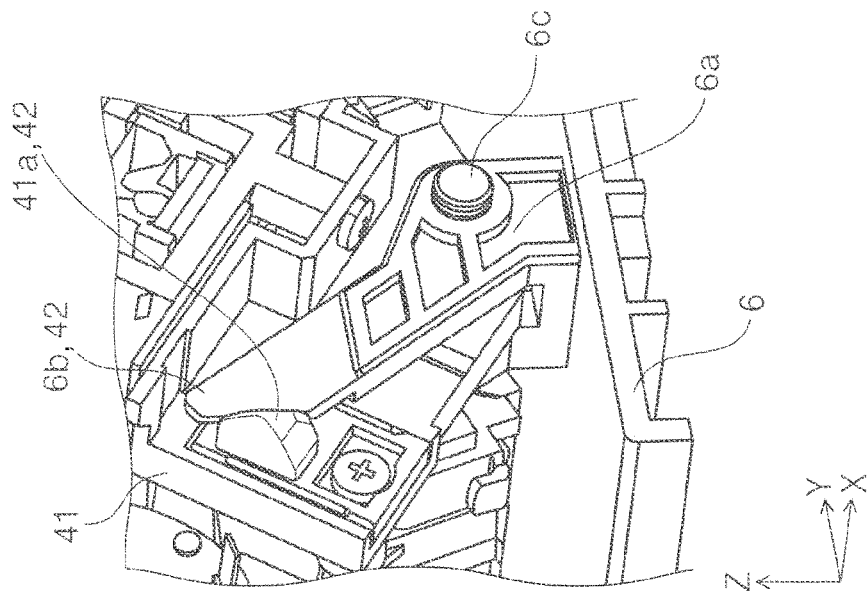
FIG. 6A is a perspective view illustrating a position holding section when the apparatus body is in a normal reading position.
Figure 6B:
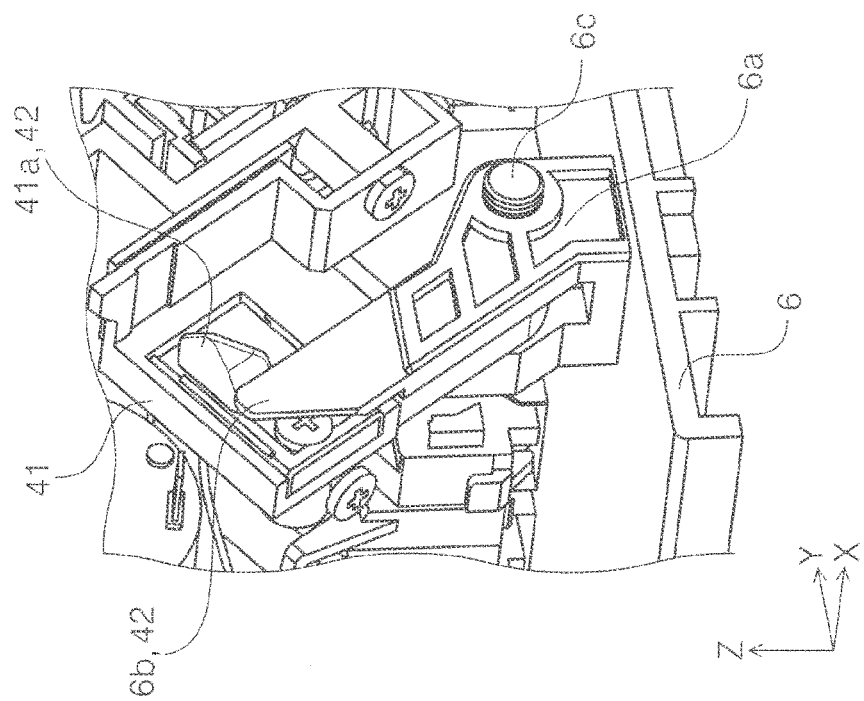
FIG. 6B is a perspective view illustrating a position holding section when an apparatus body is in a book reading position.

Next, a configuration for rotating and holding a position of the apparatus body 2 is described. The body support section 6 includes a vertical wall 6a that extends upward as illustrated in FIG. 6A and FIG. 6B, and the body rotation shaft 6c is disposed through the vertical wall 6a. Although not illustrated, two body rotation shafts 6c are disposed in the body support section 6 at a given spacing in the X-axis direction. FIG. 6A and FIG. 6B illustrate one of the two body rotation shafts 6c disposed at a given spacing in the X-axis direction, the one disposed in the +X direction.

The body rotation shaft 6c extends through a first frame 41 of the first unit 3, and thus the first frame 41, that is, the apparatus body 2, can rotate about the body rotation shaft 6c. The body rotation shaft 6c is a rotation shaft that has a rotation axis center parallel in the X-axis direction.

Figure 7A:
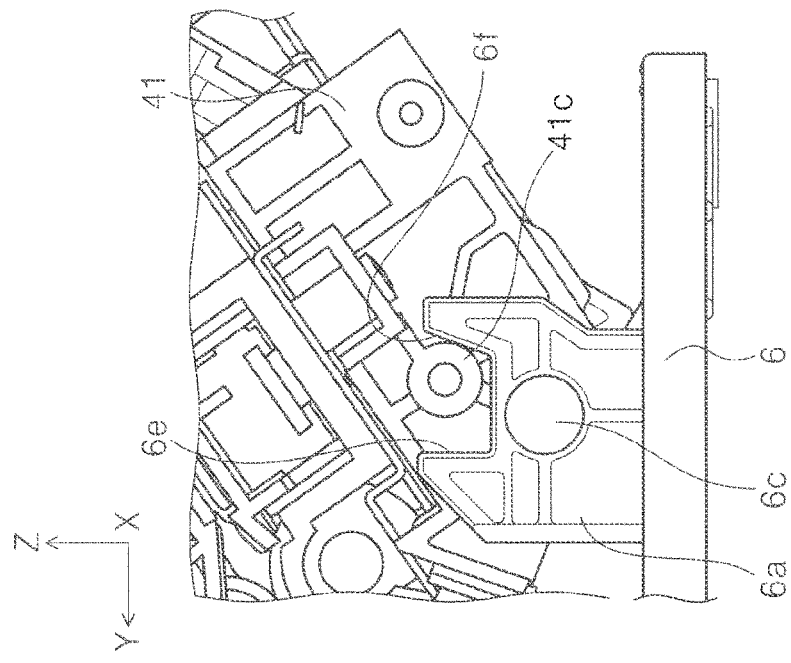
FIG. 7A is a front view of a contact section that regulates the position of an apparatus body when the apparatus body is in a normal reading position.
Figure 7B:
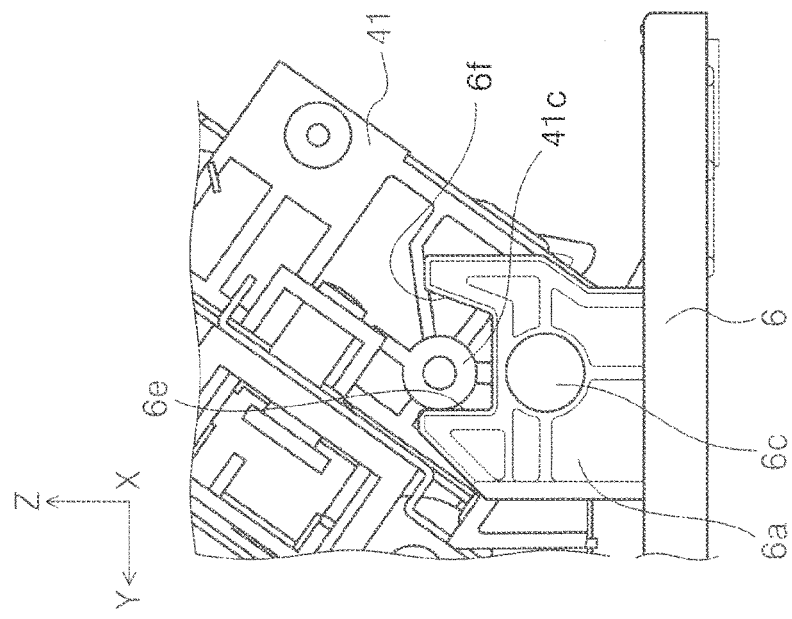
FIG. 7B is a front view of a contact section that regulates the position of an apparatus body when the apparatus body is in a book reading position.

FIG. 7A and FIG. 7B illustrate the vertical wall 6a viewed from the side opposite to the side in FIG. 6A and FIG. 6B. In FIG. 7A and FIG. 7B, the vertical wall 6a has a first contact portion 6e and a second contact portion 6f, which serve as rotation regulation portions. A boss 41c of the first frame 41 is disposed between the first contact portion 6e and the second contact portion 6f. When the apparatus body 2 rotates from the book reading position toward the normal reading position, the boss 41c comes into contact with the first contact portion 6e, thereby defining the normal reading position of the apparatus body 2. On the other hand, when the apparatus body 2 rotates from the normal reading position toward the book reading position, the boss 41c comes into contact with the second contact portion 6f, thereby defining the book reading position of the apparatus body 2.

In the normal reading position in FIG. 7A, the weight of the apparatus body 2 causes the apparatus body 2 to rotate in the counterclockwise direction in FIG. 7A, that is, the weight of the apparatus body 2 causes the boss 41c to come into contact with the first contact portion 6e. In the book reading position in FIG. 7B, the weight of the apparatus body 2 causes the apparatus body 2 to rotate in the clockwise direction in FIG. 7B, that is, the weight of the apparatus body 2 causes the boss 41c to come into contact with the second contact portion 6f. The first contact portion 6e and the second contact portion 6f according to the embodiment are provided in each of the two vertical walls 6a disposed at a given spacing in the X-axis direction, and the corresponding boss 41c is provided for the first contact portion 6e and the second contact portion 6f. It should be noted that the first contact portion 6e and the second contact portion 6f may be provided in one of the two vertical walls 6a disposed at a given spacing in the X-axis direction.

Returning to FIGS. 6, the vertical wall 6a has an elastic deformation portion 6b that extends upward. A top portion of the elastic deformation portion 6b is deformable elastically in the X-axis direction. The first frame 41 has a protrusion 41a, and the protrusion 41a engages with the elastic deformation portion 6b to reliably hold the apparatus body 2 in a position. More specifically, the elastic deformation portion 6b and the protrusion 41a function as a position holding section 42 that holds the apparatus body 2 in the normal reading position when the apparatus body 2 is in the normal reading position and holds the apparatus body 2 in the book reading position when the apparatus body 2 is in the book reading position. This configuration enables the apparatus body 2 to hold the apparatus body 2 more readily in a position. When the position of the apparatus body 2 is changed, the protrusion 41a elastically deforms the elastic deformation portion 6b and pushes the elastic deformation portion 6b aside. It should be noted that, as described above, in the normal reading position, the weight of the apparatus body 2 acts on the apparatus body 2 to hold it in the normal reading position, whereas, in the book reading position, the weight of the apparatus body 2 acts on the apparatus body 2 to hold the apparatus body 2 in the book reading position, and thus the position holding section 42 functions in an auxiliary manner in holding a position of the apparatus body 2.

The above-described elastic deformation portion 6b according to the embodiment is provided in only one of the two vertical walls 6a disposed at a given spacing in the X-axis direction, and one protrusion 41a is provided correspondingly. Accordingly, one position holding section 42 is used in this embodiment. However, the position holding section 42 is not limited to this example, and the elastic deformation portion 6b may be provided in each of the two vertical walls 6a disposed at a given spacing in the X-axis direction, and two protrusions 41a may be provided for the vertical walls 6a correspondingly, that is, a plurality of position holding sections 42 may be used.

As described above, the position of the apparatus body 2 is switched by a force applied to the apparatus body 2 by the user. It should be noted that in this configuration in which the position of the apparatus body 2 is switched by a user operation, the apparatus body 2 may include a holding section for users to put their hands on it.

Next, the position of the center of gravity of the apparatus body 2 is described. FIG. 2 to FIG. 5, FIG. 8A-1 to FIG. 8A-5, FIG. 9B-1 to FIG. 9B-5, and FIG. 11A-1 and FIG. 11B-1 illustrate positions of the center of gravity G0 of the apparatus body 2. For example, FIG. 4 and FIG. 5 illustrate the second unit 4 and the third unit 5 that are closed with respect to the first unit 3 and the upper opening/closing section 10 that is closed. Hereinafter, such a state in which the openable and closable sections are all closed is referred to as a "complete closed state" of the apparatus body 2. FIG. 4 and FIG. 5 illustrate a shaft axis C1 of the body rotation shaft 6c, a straight line Lv, which is a vertical line passing through the shaft axis C1, and a straight line Lh, which is the horizontal passing through the shaft axis C1. A point of intersection of the straight line Lv and the straight line Lh is the shaft axis C1.

As illustrated in FIG. 4 and FIG. 5, positions of the center of gravity G0 of the apparatus body 2 are vertically above the shaft axis C1 of the body rotation shaft 6c. As illustrated in FIG. 4, when the apparatus body 2 is in the normal reading position, the position of the center of gravity G0 of the apparatus body 2 is closer than the shaft axis C1 to the apparatus front in the apparatus depth direction. As illustrated in FIG. 5, when the apparatus body 2 is in the book reading position, the position of the center of gravity G0 of the apparatus body 2 is closer than the shaft axis C1 to the apparatus rear in the apparatus depth direction. An arc Lr includes a rotation path of the position of the center of gravity G0 according to position change of the apparatus body 2, and the arc is an arc with the shaft axis C1 as the center. When the position of the apparatus body 2 is changed from the normal reading position to the book reading position, the position of the center of gravity G0 moves along the arc Lr from the apparatus front toward the apparatus rear. When the position of the apparatus body 2 is changed from the book reading position to the normal reading position, the position of the center of gravity G0 moves along the arc Lr from the apparatus rear toward the apparatus front.

FIG. 4 and FIG. 5 illustrate positions of the center of gravity G3 of the first unit 3 and positions of the center of gravity G4 of the second unit 4. As illustrated in FIG. 4, when the apparatus body 2 is in the normal reading position, the position of the center of gravity G3 of the first unit 3 is the same as the position of the shaft axis C1 in the apparatus depth direction, and the position of the center of gravity G4 of the second unit 4 is closer than the shaft axis C1 to the apparatus front in the apparatus depth direction. As illustrated in FIG. 5, when the apparatus body 2 is in the book reading position, the position of the center of gravity G3 of the first unit 3 is closer than the shaft axis C1 to the apparatus rear in the apparatus depth direction, and the position of the center of gravity G4 of the second unit 4 is the same as the position of the shaft axis C1 in the apparatus depth direction.

In FIG. 4 and FIG. 5, an arc Lt includes a rotation path of the position of the center of gravity G3 according to position change of the apparatus body 2, and the arc is an arc with the shaft axis C1 as the center. When the position of the apparatus body 2 is changed from the normal reading position to the book reading position, the position of the center of gravity G3 moves along the arc Lt from the position of the shaft axis C1 toward the apparatus rear. When the position of the apparatus body 2 is changed from the book reading position to the normal reading position, the position of the center of gravity G3 moves along the arc Lt from the apparatus rear toward the shaft axis C1. In FIG. 4 and FIG. 5, an arc Ls includes a rotation path of the position of the center of gravity G4 according to position change of the apparatus body 2, and the arc is an arc with the shaft axis C1 as the center. When the position of the apparatus body 2 is changed from the normal reading position to the book reading position, the position of the center of gravity G4 moves along the arc Ls from the apparatus front toward the shaft axis C1. When the position of the apparatus body 2 is changed from the book reading position to the normal reading position, the position of the center of gravity G4 moves along the arc Ls from the shaft axis C1 toward the apparatus front.

In this embodiment, when the apparatus body 2 is in the normal reading position, the position of the center of gravity G3 of the first unit 3 is located at the position of the shaft axis C1 in the apparatus depth direction; however, the center of gravity G3 may be located at a position slightly close to the front or to the rear with respect to the position of the shaft axis C1. For example, when the apparatus body 2 is in the normal reading position, the position of the center of gravity G3 of the first unit 3 may be within a range Ya of the vertical wall 6a in the apparatus depth direction. Similarly, in this embodiment, when the apparatus body 2 is in the book reading position, the position of the center of gravity G4 of the second unit 4 is located at the position of the shaft axis C1 in the apparatus depth direction; however, the center of gravity G4 may be located at a position slightly close to the front or to the rear with respect to the position of the shaft axis C1. For example, when the apparatus body 2 is in the book reading position, the position of the center of gravity G4 of the second unit 4 may be within the range Ya of the vertical wall 6a in the apparatus depth direction.

FIGS. 8A-1 to 8A-5 illustrate changes in the center of gravity G0 when the state of the apparatus body 2 changes in a state in which the apparatus body 2 is in the normal reading position. FIGS. 9B-1 to 9B-5 illustrate changes in the center of gravity G0 when the state of the apparatus body 2 changes in a state in which the apparatus body 2 is in the book reading position. FIG. 8A-1 and FIG. 9B-1 illustrate the apparatus body 2 in which the upper opening/closing section 10 is opened from a state in which the apparatus body 2 is in a complete closed state and then the document support 9 is extended. FIG. 8A-2 and FIG. 9B-2 illustrate the apparatus body 2 in which the upper opening/closing section 10 is opened from a state in which the apparatus body 2 is in a complete closed state. FIG. 8A-3 and FIG. 9B-3 illustrate the apparatus body 2 in a complete closed state. FIG. 8A-4 and FIG. 9B-4 illustrate the apparatus body 2 in which the third unit 5 is opened from a state in which the apparatus body 2 is in a complete closed state. FIG. 8A-5 and FIG. 9B-5 illustrate the apparatus body 2 in which the second unit 4 and the third unit 5 are opened from a state in which the apparatus body 2 is in a complete closed state. FIG. 11A-1, which corresponds to FIG. 8A-1, illustrates a state in which a document P1 is mounted. FIG. 11B-1, which corresponds to FIG. 9B-1, illustrates a state in which a document P2 is mounted.

FIG. 8A-4, FIG. 8A-5, FIG. 9B-4, and FIG. 9B-5 each illustrate a state in which a document jammed in the document transport path is removed, but none of these drawings illustrate a state in which a document is read. FIG. 8A-3 and FIG. 9B-3 each illustrate a complete closed state, but do not illustrate a state in which a document is read.

In each state in FIGS. 8, a position of the center of gravity G0 of the apparatus body 2 is closer than the shaft axis C1 to the apparatus front in the apparatus depth direction regardless of the state of the apparatus body 2. In each state in FIGS. 9, a position of the center of gravity G0 of the apparatus body 2 is closer than the shaft axis C1 to the apparatus rear in the apparatus depth direction except for the state in FIG. 9B-5. As illustrated in FIG. 11A-1 and FIG. 11B-1, positions of the center of gravity G0 of the apparatus body 2 in plan view are close to the intersections of a line Lx, which is a shaft axis line of the body rotation shaft 6c, and a line Ly, which is a line passing through the center of the document in the width direction and is parallel in the Y-axis direction.

In an example in FIG. 8A-1, the supported document P1 consists of a maximum number of plain paper sheets that are supported. In FIG. 8A-1, a reference G0-1 denotes a position of the center of gravity of the apparatus body 2 when no document P1 is mounted, and a reference G0-2 denotes a position of the center of gravity of the apparatus body 2 when document sheets P1 are mounted. In the normal reading position, the position of the center of gravity G0-1 and the position of the center of gravity G0-2 are both closer than the shaft axis C1 to the apparatus front in the apparatus depth direction. In FIG. 9B-1, a document P2, for example, a book is supported and the book is, for example, a passport. The reference G0-1 denotes a position of the center of gravity of the apparatus body 2 when no document P2 is mounted, and the reference G0-2 denotes a position of the center of gravity of the apparatus body 2 when the document P2 is mounted. In the book reading position, the position of the center of gravity G0-1 and the position of the center of gravity G0-2 are both closer than the shaft axis C1 to the apparatus rear in the apparatus depth direction.

Figure 10:
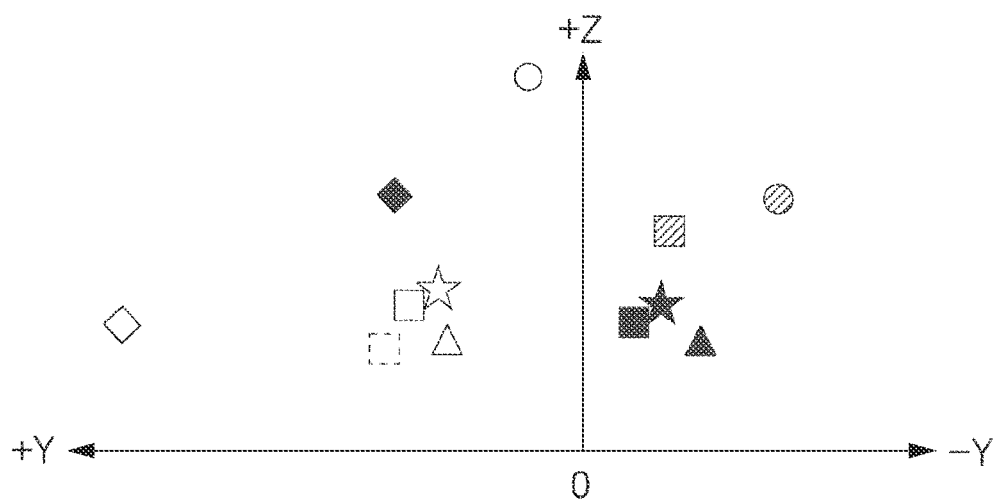
FIG. 10 is a plot of the center of gravity of an apparatus body in respective positions and in respective states.

FIG. 10 illustrates all positions of the center of gravity G0 in respective states when the apparatus body 2 is in the normal reading position and all positions of the center of gravity G0 in respective states when the apparatus body 2 is in the book reading position. In FIG. 10, the vertical axis indicates the positions of the center of gravity G0 in the vertical direction (Z-axis direction), and the horizontal axis indicates the positions of the center of gravity G0 in the apparatus depth direction (Y-axis direction). In FIG. 10, references, such as A-1, correspond to the references in FIG. 8 and FIG. 9. The origin point in FIG. 10 indicates the position of the shaft axis C1.

As described above, the positions of the center of gravity G0 of the apparatus body 2 are located vertically above the shaft axis C1 of the body rotation shaft 6c. The positions of the center of gravity G0 of the apparatus body 2 in the apparatus depth direction (Y-axis direction), which intersects the axis direction (X-axis direction) of the body rotation shaft 6c and the vertical direction (Z-axis direction), are located closer than the shaft axis C1 to the apparatus front when the apparatus body 2 is in the normal reading position, and are located closer than the shaft axis C1 to the apparatus rear when the apparatus body 2 is in the book reading position.

Accordingly, when the apparatus body 2 is in the normal reading position, the weight of the apparatus body 2 acts by gravity in the direction in which the apparatus body 2 stays in the normal reading position, that is, when the apparatus body 2 is in the normal reading position, the weight of the apparatus body 2 does not act in the direction in which the apparatus body 2 moves to the book reading position. Similarly, when the apparatus body 2 is in the book reading position, the weight of the apparatus body 2 does not act in the direction in which the apparatus body 2 moves to the normal reading position. This configuration enables the apparatus body 2 to stay in a position stably, and thus a larger position holding section 42 for holding the apparatus body 2 in a position can be eliminated and its cost can be eliminated. Hereinafter, these effects and advantages are referred to as first effects and advantages.

The upper opening/closing section 10 is a tray that can be switched between a state in which the upper opening/closing section 10 is accommodated in the apparatus body 2 (FIG. 8A-3, FIG. 9B-3) and a state in which the upper opening/ closing section 10 is extended from the apparatus body 2 (FIG. 8A-1, FIG. 8A-2, FIG. 9B-1, FIG. 9B-2). The upper opening/closing section 10 is an example feed tray that is disposed closer than the shaft axis C1 to the apparatus rear in the apparatus depth direction in a state in which the upper opening/closing section 10 is extended from the apparatus body 2. As illustrated in FIG. 8 and FIGS. 9, regardless of the opening/closing state of the upper opening/closing section 10, the positions of the center of gravity G0 of the apparatus body 2 in the apparatus depth direction are closer than the shaft axis C1 to the apparatus front when the apparatus body 2 is in the normal reading position and are closer than the shaft axis C1 to the apparatus rear when the apparatus body 2 is in the book reading position. Accordingly, this configuration can achieve the above-described first effects and advantages regardless of the opening/closing state of the upper opening/closing section 10.

It should be noted that the upper opening/closing section 10 (document support portion 11) and the document support 9 may be integrated into a feed tray. The document support 9 according to the embodiment is light and contributes little to the position of the center of gravity G0 of the apparatus body 2. Accordingly, regardless of whether the document support 9 is in the accommodation state or the extended state, the positions of the center of gravity G0 of the apparatus body 2 are closer than the shaft axis C1 to the apparatus front when the apparatus body 2 is in the normal reading position and are closer than the shaft axis C1 to the apparatus rear when the apparatus body 2 is in the book reading position.

As illustrated in FIG. 8 and FIGS. 9, regardless of the opening/closing state of the third unit 5, the positions of the center of gravity G0 of the apparatus body 2 in the apparatus depth direction are closer than the shaft axis C1 to the apparatus front when the apparatus body 2 is in the normal reading position and are closer than the shaft axis C1 to the apparatus rear when the apparatus body 2 is in the book reading position. Accordingly, this configuration can achieve the above-described first effects and advantages regardless of the opening/closing state of the third unit 5.

In this embodiment, as illustrated in FIGS. 9, positions of the center of gravity G0 of the apparatus body 2 are closer than the shaft axis C1 to the apparatus rear in the apparatus depth direction when the apparatus body 2 is in the book reading position, except for the state illustrated in FIG. 9B-5. The position of the center of gravity G0 illustrated in FIG. 9B-5, however, can be located at a position closer than the shaft axis C1 to the apparatus rear, for example, when a maximum open angle of the second unit 4 and the third unit 5 is smaller than that in this embodiment. As described above, this configuration, in which, regardless of the opening/closing state of the second unit 4, the positions of the center of gravity G0 of the apparatus body 2 in the apparatus depth direction are closer than the shaft axis C1 to the apparatus front when the apparatus body 2 is in the normal reading position, and are closer than the shaft axis C1 to the apparatus rear when the apparatus body 2 is in the book reading position, can achieve the above-described first effects and advantages regardless of the opening/closing state of the second unit 4.

The position of the center of gravity G3 of the first unit 3 illustrated in FIG. 5 according to the embodiment is closer than the shaft axis C1 to the apparatus rear in the apparatus depth direction when the apparatus body 2 is in the book reading position. Accordingly, this configuration enables the apparatus body 2 to readily bring the position of the center of gravity G0 of the apparatus body 2 to a position closer than the shaft axis C1 to the apparatus rear when the apparatus body 2 is in the book reading position.

In this embodiment, as illustrated in FIG. 4, when the apparatus body 2 is in the normal reading position, the position of the center of gravity G4 of the second unit 4 is closer than the shaft axis C1 to the apparatus front in the apparatus depth direction. Accordingly, this configuration enables the apparatus body 2 to readily bring the position of the center of gravity G0 of the apparatus body 2 to a position closer than the shaft axis C1 to the apparatus front when the apparatus body 2 is in the normal reading position.

The operation section 7 according to the embodiment is disposed at the position to rotate the apparatus body 2 toward the normal reading position when the operation section 7 is pressed by the user. A pressing force Ft in FIG. 4 and FIG. 5 is applied to the apparatus body 2 when the user presses the operation section 7, and the pressing force Ft acts to rotate the apparatus body 2 clockwise in FIG. 4 and FIG. 5, that is, the pressing force Ft acts in the direction in which the apparatus body 2 moves toward the normal reading position. Accordingly, when the user operates the operation section 7 when the apparatus body 2 is in the book reading position, the pressing force Ft acts in the direction to change the position of the apparatus body 2, and it is undesirable. Here, a distance Y2 (FIG. 5) between the position of the center of gravity G0 of the apparatus body 2 and the shaft axis C1 in the apparatus depth direction when the apparatus body 2 is in the book reading position is longer than a distance Y1 (FIG. 4) between the position of the center of gravity G0 of the apparatus body 2 and the shaft axis C1 when the apparatus body 2 is in the normal reading position. With this configuration, when the apparatus body 2 is in the book reading position, the apparatus body 2 is less likely to rotate from the book reading position toward the normal reading position in response to the user operating the operation section 7.

Figure 12A:
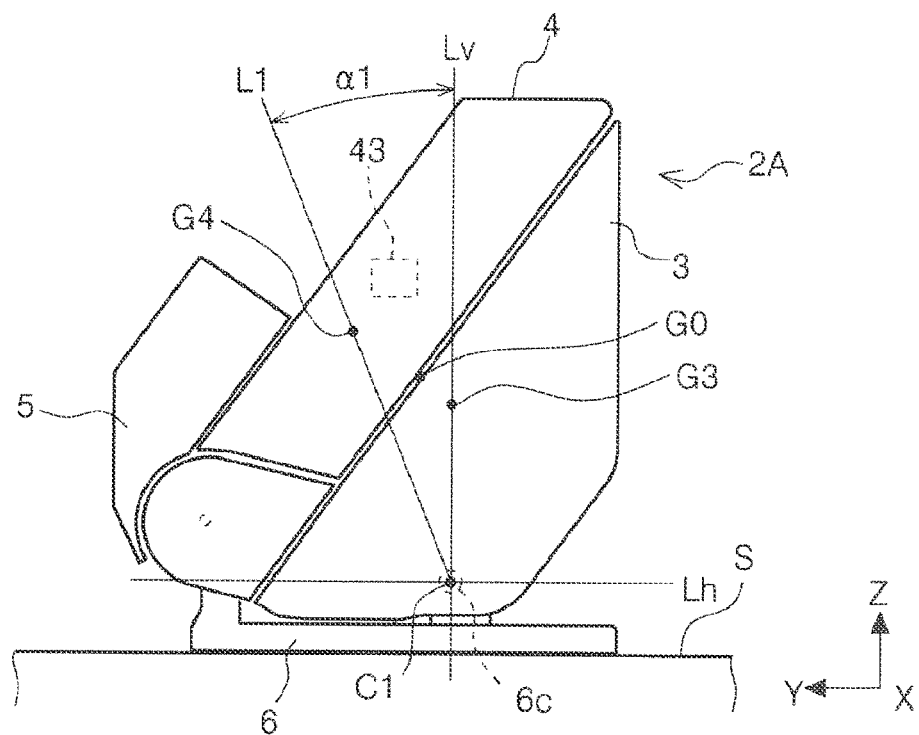
FIGS. 12A and 12B illustrate an apparatus body according to another embodiment.
Figure 12B:
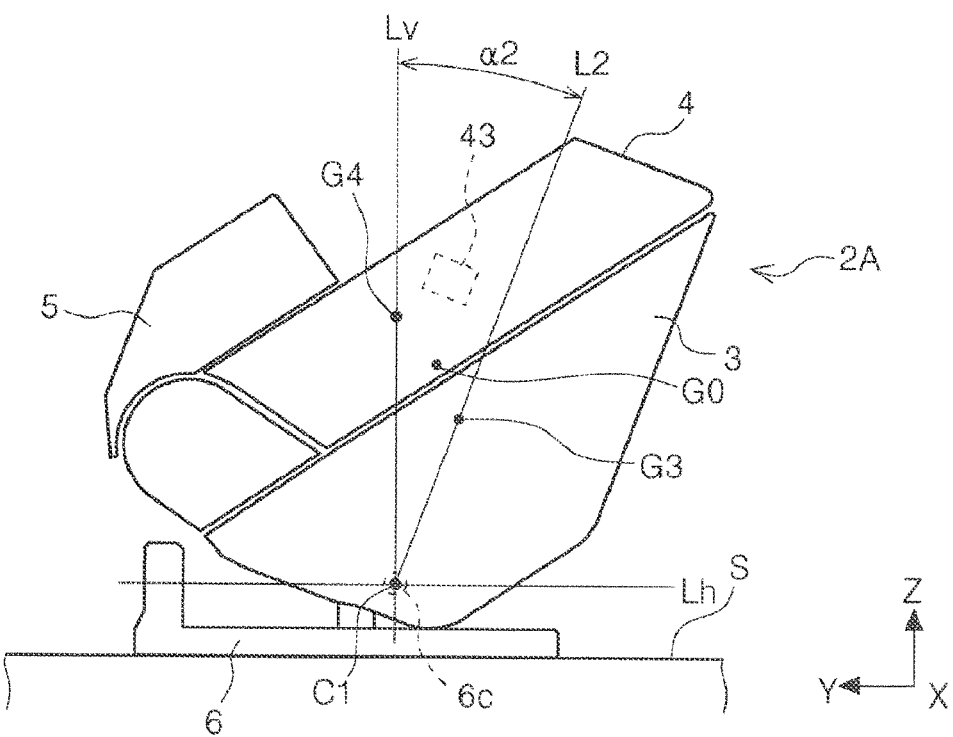

It should be noted that a weight that is located at a position closer than the shaft axis C1 to the apparatus front when the apparatus body 2 is in the normal reading position and located at a position closer than the shaft axis C1 to the apparatus rear when the apparatus body 2 is in the book reading position may be provided. FIGS. 12A and 12B illustrate such an apparatus body 2A according to another embodiment. In this embodiment, a weight 43 is disposed in the second unit 4.

A straight line L1 in FIG. 12A passes through the position of the center of gravity G4 of the second unit 4 and the shaft axis C1. A straight line L2 in FIG. 12B passes through the position of the center of gravity G3 of the first unit 3 and the shaft axis C1. The weight 43 may be located in an area α1 between the vertical line Lv and the straight line L1 when the apparatus body 2 is in the normal reading position and may be located in an area α2 between the vertical line Lv and the straight line L1 when the apparatus body 2 is in the book reading position. Such a weight 43 enables the apparatus body 2 to readily bring the position of the center of gravity G0 of the apparatus body 2 to a position closer than the shaft axis C1 to the apparatus front when the apparatus body 2 is in the normal reading position and to readily bring the position of the center of gravity G0 of the apparatus body 2 to a position closer than the shaft axis C1 to the apparatus rear when the apparatus body 2 is in the book reading position.

The weight 43 may be used alone, or a part for weight increase may be provided as the weight to a portion of an existing part, such as a frame. In addition, a heavy object, such as a motor, in the scanner 1 may be used as the weight.

Figure 13A:
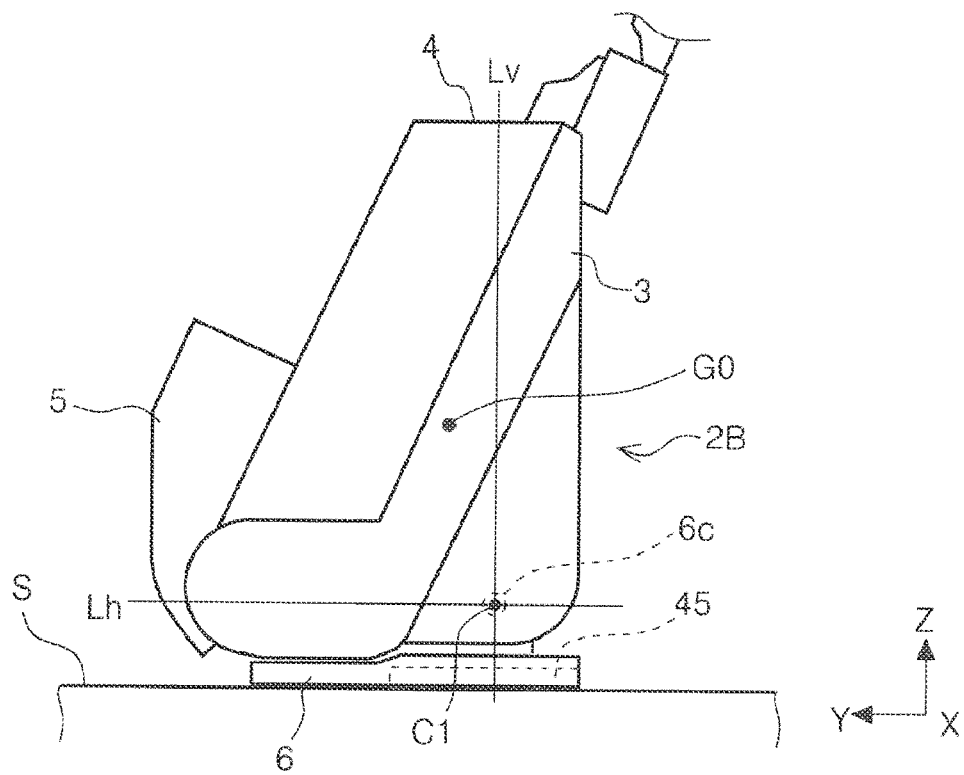
FIGS. 13A and 13B illustrate an apparatus body according to still another embodiment.
Figure 13B:
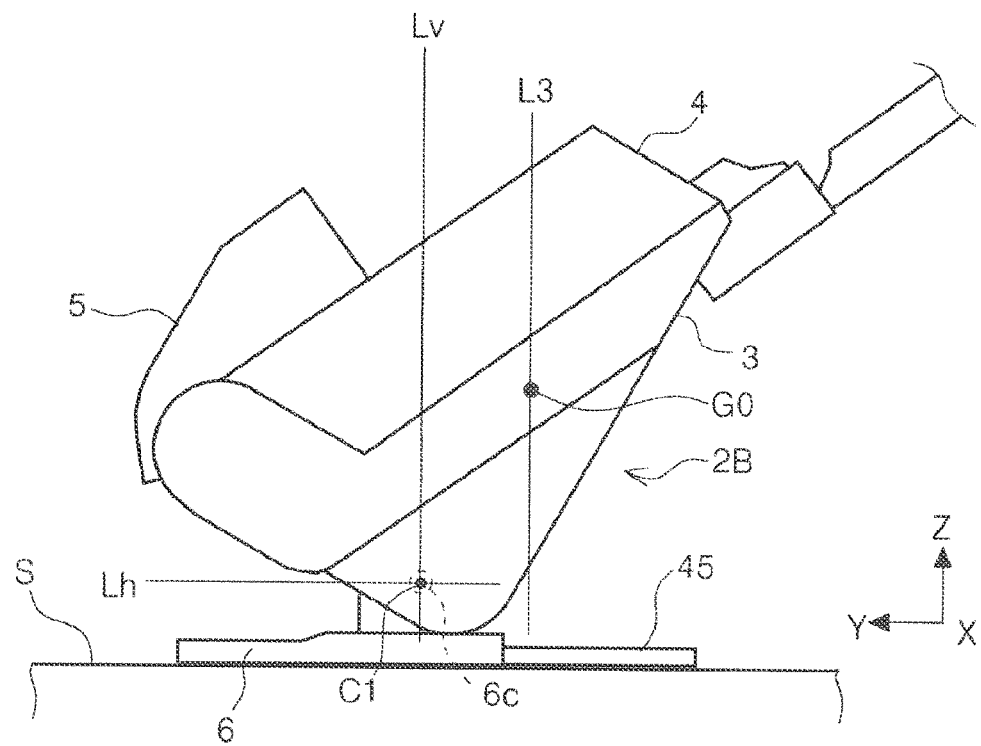

FIGS. 13A and 13B illustrate an apparatus body 2B according to still another embodiment. The apparatus body 2B protrudes more than the apparatus body 2B in the book reading position from the body support section 6 rearward in the apparatus depth direction when the apparatus body 2B is in the normal reading position. Accordingly, the apparatus body 2B is more likely to tilt rearward in the book reading position; however, the body support section 6 includes an auxiliary member 45 that can be switched between an accommodation state and an extended state in which the auxiliary member 45 protrudes rearward in the apparatus depth direction more than the apparatus body 2B in the accommodation state and in contact with the mounting surface S in the extended state. FIG. 13A illustrates the auxiliary member 45 in the accommodated state. FIG. 13B illustrates the auxiliary member 45 in the extended state. Such an auxiliary member 45 suppresses the apparatus body 2B from toppling over when the apparatus body 2B is in the book reading position. Although the auxiliary member 45 is switched between the accommodation state and the extended state by being slid in the Y-axis direction, the auxiliary member 45 may be switched between the accommodation state and the extended state by being rotated about a rotation axis in the Z-axis direction. An interlock that links the auxiliary member 45 and the apparatus body 2B may be provided, and the auxiliary member 45 may be switched from the accommodation state to the extended state when the apparatus body 2B is switched from the normal reading position to the book reading position. In addition, in such a case, the auxiliary member 45 may be switched from the extended state to the accommodation state when the apparatus body 2B is switched from the book reading position to the normal reading position. Such an interlock may be a mechanical unit, such as a cam mechanism, or an actuator, such as a motor, a solenoid, or the like.

When the apparatus body 2B is in the book reading position, the position of the center of gravity G0 of the apparatus body 2B is located at a position closer than the body support section 6 to the apparatus rear in the apparatus depth direction and vertically above the auxiliary member 45 in the extended state. A straight line L3 in FIG. 13B is a vertical line that passes through the position of the center of gravity G0 of the apparatus body 2B. The vertical line L3 crosses the auxiliary member 45 in the extended state. In such a configuration, when the apparatus body 2B is in the book reading position, the apparatus body 2B more likely to topple over rearward in the apparatus depth direction; however, the position of the center of gravity G0 of the apparatus body 2B is located vertically above the auxiliary member 45 in the extended state, and thus the apparatus body 2B can be reliably suppressed from toppling over when the apparatus body 2B is in the book reading position.

Figure 14A:
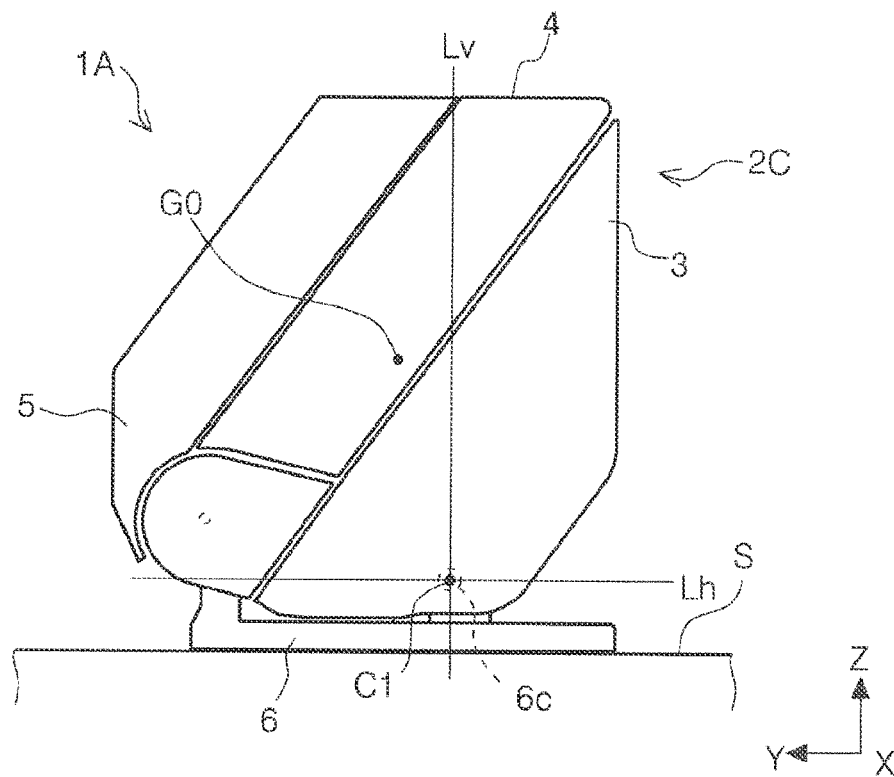
FIGS. 14A and 14B illustrate an apparatus body according to yet another embodiment.
Figure 14B:
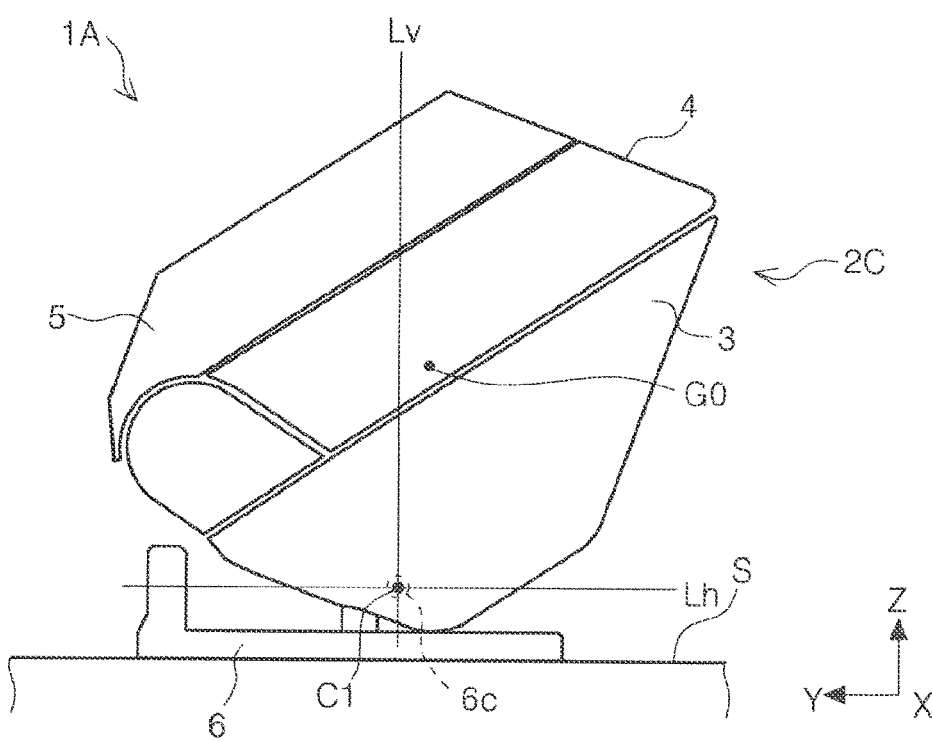
Figure 15:
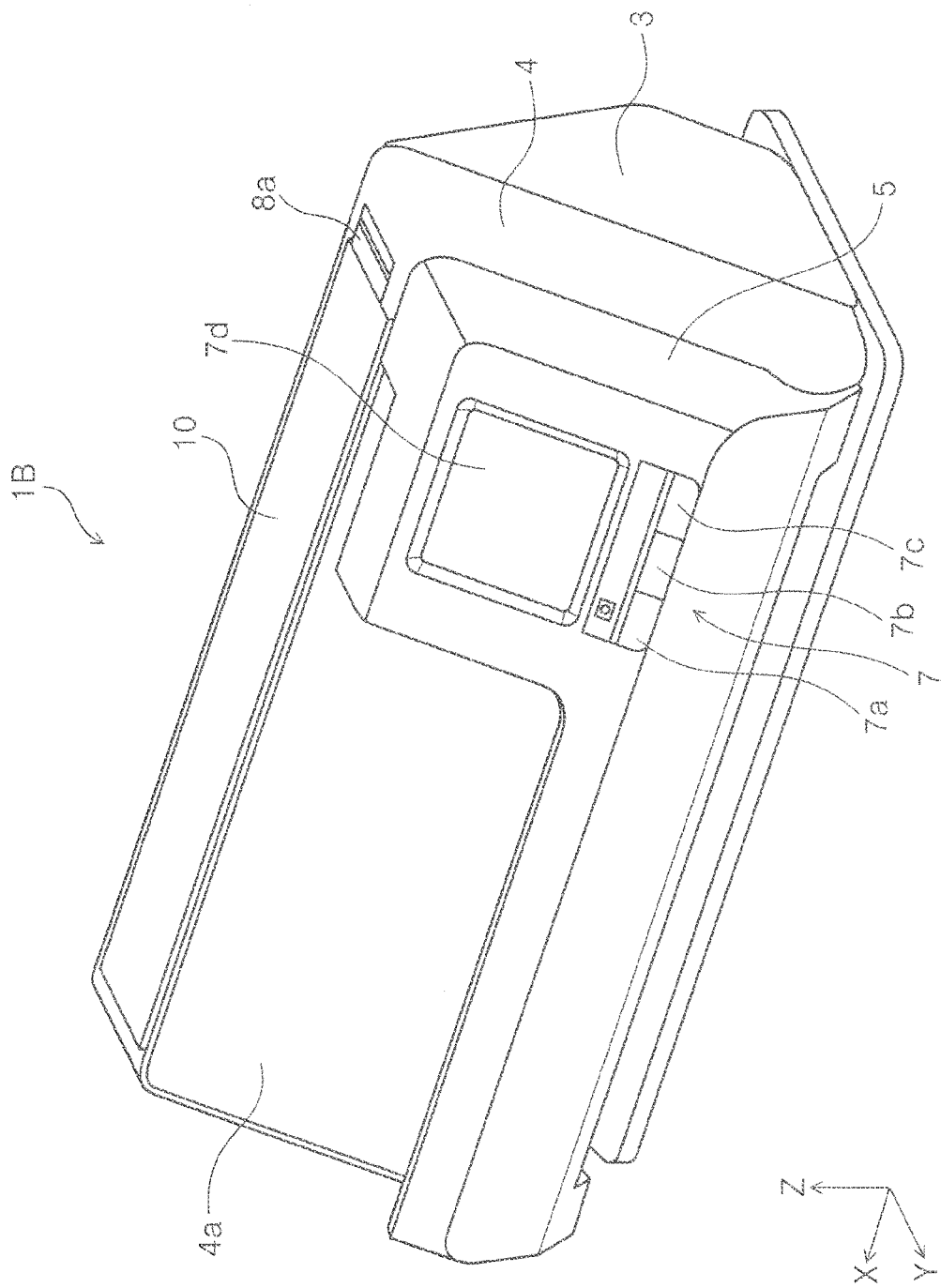
FIG. 15 is a perspective view illustrating the scanner according to the yet another embodiment viewed from the front.

A scanner 1A and an apparatus body 2C according to yet another embodiment are described with reference to FIG. 14 and FIG. 15. An operation section 7A according to the embodiment disposed on the third unit 5 differs from the above-described embodiment in that the operation section 7A includes a display section 7d, as illustrated in FIG. 15. In this embodiment, the third unit 5 includes the display section 7d, and thus the position of the center of gravity G0 of the apparatus body 2C is slightly closer than the above-described embodiment to the apparatus front in the apparatus depth direction. However, also in this embodiment illustrated in FIGS. 14A and 14B, the position of the center of gravity G0 of the apparatus body 2C is closer than the shaft axis C1 to the apparatus front when the apparatus body 2C is in the normal reading position and is closer than the shaft axis C1 to the apparatus rear when the apparatus body 2C is in the book reading position.

It is to be understood that the present disclosure is not limited to the above-described embodiments, various modifications may be made within the scope of the following claims, and such modifications are also included within the scope of the present disclosure.

What is claimed is:

1. An image reading apparatus comprising:
    a body support section mounted on an apparatus mounting surface;
    an apparatus body supported by the body support section;
    a reading section configured to read a document; and
    a reading transport path that is a document transport path on which the document is transported, the reading transport path facing the reading section, wherein
    the apparatus body is configured to rotate about a rotation shaft with respect to the body support section and the apparatus body is rotated to be switched to a first position or a second position at which an angle formed by the reading transport path and the mounting surface is smaller than an angle formed by the reading transport path and the mounting surface at the first position,
    a position of the center of gravity of the apparatus body is located at a position vertically above a shaft axis of the rotation shaft and closer than the shaft axis to an apparatus front in an apparatus depth direction that is a direction intersecting the axis direction of the rotation shaft and the vertical direction when the apparatus body is in the first position, and is located at a position vertically above the shaft axis of the rotation shaft and closer than the shaft axis to an apparatus rear in the depth direction when the apparatus body is in the second position.

2. The image reading apparatus according to claim 1, wherein
    the apparatus body includes a feed tray configured to be switched between a state in which the feed tray is accommodated in the apparatus body and a state in which the feed tray is extended from the apparatus body, the feed tray disposed closer than the shaft axis to the apparatus rear in the apparatus depth direction in the state in which the feed tray is extended from the apparatus body, and
    the position of the center of gravity of the apparatus body in the apparatus depth direction is, regardless of the state of the feed tray, located at a position closer than the shaft axis to the apparatus front when the apparatus body is in the first position, and located at a position closer than the shaft axis to the apparatus rear when the apparatus body is in the second position.

3. The image reading apparatus according to claim 1, wherein the apparatus body comprises a first unit that serves as a lower side of the reading transport path, and a second unit openable and closable with respect to the first unit, the second unit serving as an upper side of the reading transport path, wherein
    the position of the center of gravity of the apparatus body in the apparatus depth direction is, regardless of the state of the second unit, located at a position closer than the shaft axis to the apparatus front when the apparatus body is in the first position, and located at a position closer than the shaft axis to the apparatus rear when the apparatus body is in the second position.

4. The image reading apparatus according to claim 3, wherein the position of the center of gravity of the first unit is located at a position closer than the shaft axis to the apparatus rear in the apparatus depth direction when the apparatus body is in the second position.

5. The image reading apparatus according to claim 3, wherein the position of the center of gravity of the second unit is located at a position closer than the shaft axis to the apparatus front in the apparatus depth direction when the apparatus body is in the first position.

6. The image reading apparatus according to claim 1, wherein the apparatus body comprises a first unit that serves as a lower side of the reading transport path, a second unit openable and closable with respect to the first unit, the second unit serving as an upper side of the reading transport path, and a third unit rotatable with respect to both the first unit and the second unit, the third unit serving as a document transport path downstream of the reading transport path, wherein
the position of the center of gravity of the apparatus body in the apparatus depth direction is, regardless of the state of the third unit, located at a position closer than the shaft axis to the apparatus front when the apparatus body is in the first position, and located at a position closer than the shaft axis to the apparatus rear when the apparatus body is in the second position.

7. The image reading apparatus according to claim 1, wherein the apparatus body comprises a weight that is located at a position closer than the shaft axis to the apparatus front in the apparatus depth direction when the apparatus body is in the first position and is located at a position closer than the shaft axis to the apparatus rear in the apparatus depth direction when the apparatus body is in the second position.

8. The image reading apparatus according to claim 1, further comprising:
an operation section disposed on the front of the apparatus body in the apparatus depth direction, the operation section being configured to receive an operation from a user, wherein
the operation section is disposed at a position to rotate the apparatus body toward the first position when the operation section is pressed by the user, and
a distance between the position of the center of gravity of the apparatus body and the shaft axis in the apparatus depth direction when the apparatus body is in the second position is longer than a distance between the position of the center of gravity of the apparatus body and the shaft axis when the apparatus body is in the first position.

9. The image reading apparatus according to claim 1, further comprising:
a position holding section configured to hold the apparatus body in the first position when the apparatus body is in the first position and hold the apparatus body in the second position when the apparatus body is in the second position.

10. The image reading apparatus according to claim 1, wherein the apparatus body in the second position protrudes from the body support section rearward in the apparatus depth direction more than the apparatus body in the first position, and
the body support section comprises an auxiliary member configured to be switched between an accommodation state and an extended state in which the auxiliary member protrudes rearward in the apparatus depth direction more than the apparatus body and in contact with the mounting surface in the extended state.

11. The image reading apparatus according to claim 10, wherein the position of the center of gravity of the apparatus body is located at a position closer than the body support section to the apparatus rear in the apparatus depth direction and vertically above the auxiliary member in the extended state, when the apparatus body is in the second position.

* * * * *